United States Patent
Rozen et al.

(10) Patent No.: US 10,803,381 B2
(45) Date of Patent: Oct. 13, 2020

(54) FIXED POINT INTEGER IMPLEMENTATIONS FOR NEURAL NETWORKS

(71) Applicant: INTEL CORPORATION, Santa Clara, CA (US)

(72) Inventors: Piotr Rozen, Gdansk (PL); Georg Stemmer, Munich (DE)

(73) Assignee: Intel Corporation, Santa Clara, CA (US)

(*) Notice: Subject to any disclaimer, the term of this patent is extended or adjusted under 35 U.S.C. 154(b) by 929 days.

(21) Appl. No.: 15/500,405

(22) PCT Filed: Sep. 9, 2014

(86) PCT No.: PCT/PL2014/050053
§ 371 (c)(1),
(2) Date: Jan. 30, 2017

(87) PCT Pub. No.: WO2016/039651
PCT Pub. Date: Mar. 17, 2016

(65) Prior Publication Data
US 2017/0220929 A1    Aug. 3, 2017

(51) Int. Cl.
*G06N 3/08* (2006.01)
*G10L 15/22* (2006.01)
*G11C 11/54* (2006.01)
*A61B 5/00* (2006.01)
*G06N 3/063* (2006.01)
*G06F 7/483* (2006.01)
(Continued)

(52) U.S. Cl.
CPC .............. *G06N 3/08* (2013.01); *G06F 7/483* (2013.01); *G06N 3/04* (2013.01); *G06N 3/063* (2013.01); *G10L 15/16* (2013.01); *G10L 15/02* (2013.01)

(58) Field of Classification Search
CPC .......... G10L 15/16; G10L 15/02; G06N 3/08; G06N 3/02; G06N 3/063; G06F 7/483
USPC ....................................................... 706/1–62
See application file for complete search history.

(56) References Cited

U.S. PATENT DOCUMENTS

| 9,092,749 B2 * | 7/2015 | Kern ................. G06Q 10/06311 |
| 2005/0228673 A1 | 10/2005 | Nefian et al. |

(Continued)

FOREIGN PATENT DOCUMENTS

| CN | 1930575 | 3/2007 |
| CN | 102207768 | 10/2011 |

OTHER PUBLICATIONS

Lange, R., "Design of a Generic Neural Network FPGA-Implementation", 2005, Diplomarbeit, Faculty of Electrical Engineering and Information Technology, Professorship of Circuit and Systems Design, Nov. 2, 2005 (Year: 2005).*

(Continued)

*Primary Examiner* — Brandon S Cole
(74) *Attorney, Agent, or Firm* — Green, Howard & Mughal LLP.

(57) ABSTRACT

Techniques related to implementing neural networks for speech recognition systems are discussed. Such techniques may include processing a node of the neural network by determining a score for the node as a product of weights and inputs such that the weights are fixed point integer values, applying a correction to the score based on a correction value associated with at least one of the weights, and generating an output from the node based on the corrected score.

25 Claims, 9 Drawing Sheets

(51) Int. Cl.
*G06N 3/04* (2006.01)
*G10L 15/16* (2006.01)
*G10L 15/02* (2006.01)

(56) References Cited

U.S. PATENT DOCUMENTS

| | | |
|---|---|---|
| 2011/0239020 A1 | 9/2011 | Sujith et al. |
| 2014/0114584 A1* | 4/2014 | Bruestle ................ G16B 30/00 702/20 |

OTHER PUBLICATIONS

Lei, X., et al., "Accurate and Compact Large Vocabulary Speech Recognition on Mobile Devices", 2013, Interspeech, Lyon France, Aug. 25-29 2013, ISCA, pp. 662-665 (Year: 2013).*

Notice of Allowance for Chinese Patent Application No. 201480081073.6, dated Apr. 10, 2019.

Hinton, G. et al., "Deep Neural Networks for Acoustic Modeling in Speech Recognition—The Shared Views of Four Research Groups", IEEE Signal Processing Magazine, Nov. 2012, pp. 82-97.

Wikibooks, "Artificial Neural Networks/Activation Functions", Wikibooks, retrieved online via https://en.wikibooks.org/wiki/Artificial_Neural_Networks/Activation_Functions, Jun. 27, 2019, 4 pages.

International Search Report and Written Opinion for International Patent Application No. PCT/PL2014/050053, dated Apr. 2, 2015.

Barnard et al., "Real-world speech recognition with neural networks", Proceedings of SPIE, vol. 2492, Apr. 6, 1995.

Hoehfeld, M. et al., "Learning with Limited Numerical Precision using the Cascade-Correlation Algorithm", IEEE Transactions on Neural Networks, vol. 3, No. 4, Jul. 4, 1992, pp. 602-611, IEEE Service Center, Piscataway, NJ, USA.

Lange, Robert, "Design of a Generic Neural Network FPGA-Implementation", Nov. 2, 2005, pp. 1-143; Retrieved from the Internet on Mar. 10, 2015 via www.sethdepot.org/papers/src/neuralnetworks.pdf.

Vanhoucke, Vincent et al., "Improving the speed of neural networks on CPUs", Dec. 17, 2011; retrieved from the Internet on Mar. 10, 2015 via www.deeplearningworkshopnips2011.files.wordpress.com.

Office Action for Chinese Patent Application No. 201480081073.6, dated Jul. 31, 2018.

* cited by examiner

1000

```
┌─────────────────────────────────────────────────────────────┐
│  Determine a Score for a Node of a Neural Network as the Sum of │
│       Products of Node Inputs and Node Weights              │
│                          1001                                │
└─────────────────────────────────────────────────────────────┘
                              │
                              ▼
┌─────────────────────────────────────────────────────────────┐
│            Modify the Score based on a Node Bias            │
│                          1002                                │
└─────────────────────────────────────────────────────────────┘
                              │
                              ▼
┌─────────────────────────────────────────────────────────────┐
│   Apply one or more Corrections to the Score based on Correction │
│        Value(s) associated with the Node Weights            │
│                          1003                                │
└─────────────────────────────────────────────────────────────┘
                              │
                              ▼
┌─────────────────────────────────────────────────────────────┐
│      Generate a Node Output based on the Corrected Biased Score │
│                          1004                                │
└─────────────────────────────────────────────────────────────┘
```

FIG. 10

FIXED POINT INTEGER IMPLEMENTATIONS FOR NEURAL NETWORKS

CLAIM OF PRIORITY

This Application is a National Stage Entry of, and claims priority to, PCT Application No. PCT/PL2014/050053, filed on 9 Sep. 2014 and titled "IMPROVED FIXED POINT INTEGER IMPLEMENTATIONS FOR NEURAL NETWORKS", which is incorporated by reference in its entirety for all purposes.

BACKGROUND

Neural networks including deep neural networks and convolutional neural networks may be used for machine learning and perceptual and cognitive systems. Such neural networks may be used in a variety of implementations such as speech recognition, image processing, optical character recognition, and the like. For example, neural networks may include interconnected layers of neurons or nodes. Input values for each layer include inputs to the system (e.g., at the input layer) or outputs from a previous layer in the neural network. Output values from the output layer of the neural network may include classification values or the like such that the input to the neural network may be classified via the neural network and/or additional processing. Such neural network processing and classifications may be used to perform classifications or other tasks that may be difficult or impossible to perform with more standard rule-based processing systems.

A problem with current neural networks in real-time applications is the large computational effort needed to evaluate the neural network. To address this problem, some current implementations offload neural network computations from a central processing unit (CPU) of a device to a graphics processing unit (GPU) of the device. However, such offloading may cause conflicts with other GPU-intensive applications such as games being run on the device or the device's camera or the like. Furthermore, intensive use of the device's GPU may increase power usage and thereby limit battery life for mobile devices. In other implementations, single instruction, multiple data (SIMD) platforms and/or optimizations such as batched lazy evaluation models (which may delay calculations until needed) may be used. However, such implementations may have reduced classification accuracy.

As such, existing techniques do not provide real-time, efficient, and accurate neural network implementations. Such problems may become critical as the desire to utilize classifications via neural networks such as in speech recognition, image processing, optical character recognition, and the like becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 10 is a flow diagram illustrating an example process for processing a node of a neural network;

DETAILED DESCRIPTION

Figure 1:
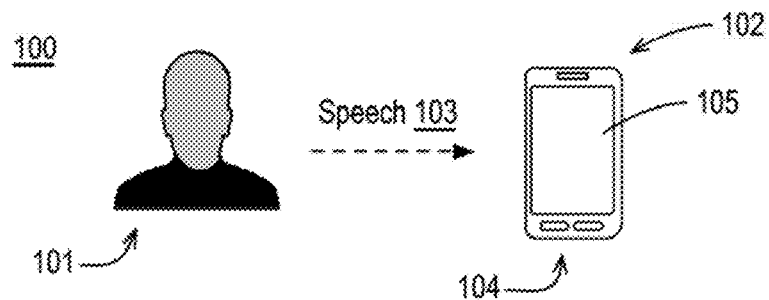
FIG. 1 is an illustrative diagram of an example setting for providing speech recognition.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof.

The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to neural networks and, in some examples, to implementing neural networks for speech recognition.

As described above, implementing neural networks in real time may be advantageous to users but difficult due to limited computational resources and intensive use of battery resources. Furthermore, attempts to reduce such resource usage may provide inaccurate classification results. Furthermore, optimizing neural networks may have a direct correlation to total cost of ownership in services hosted via a data center and to battery life in applications implemented via a mobile device.

In some embodiments discussed herein, neural network weights (e.g., parameters) may be represented as fixed point integer values such as 8 bit fixed point integer values. In contrast to floating point neural network weights or larger fixed point integer value neural network weights (e.g., 16 bit fixed point integer values), 8 bit fixed point integer values may provide less required memory transfer (e.g., memory transfer is reduced by a factor of 2 as compared to 16 bit fixed point integer value implementations and the memory footprint may shrink by a factor between about 3 and 4 as compared to a 32 bit floating point representation) and reduced computation cost. For example, computation cost may be reduced as 8 bit fixed point integer value weights and 8 bit fixed point integer value inputs (e.g., for some or all layers of the neural network) may be used instead of 16 bit fixed point integer values. To provide classification accuracy using such weight and input values, correction(s) may be made at nodes of the neural networks for weights that have corresponding correction values as is discussed further herein.

In some examples, a node of the neural network may be processed by determining a score for the node as a sum of products of inputs to the node and weights associated with the node such that the weights are fixed point integer values. In some examples, the weights may be 8 bit signed fixed point integer values having an associated scaling factor for the layer of the neural network that includes the node. Furthermore, in some examples, the inputs to the node may be 8 bit unsigned fixed point integer values. The score from the node may be modified by a bias associated with the node and/or corrected based on one or more of the weights having associated correction values. The correction values may be stored in a corrections list and the correction values may have been determined prior to implementing the neural network.

For example, weights of the neural network may be converted from floating point values to 8 bit signed fixed point integer values with an associated scaling factor. The scaling factor may be determined based on a predetermined limit of a correction count for a particular layer of the neural network. For example, the predetermined limit may be the number of nodes in the layer increased by a factor (e.g., a factor of 3, 4, or 5 or the like). The scaling factor may then be determined as a maximum scaling factor value that provides for a maximum number of corrected weights for the neural network layer that is just below the predetermined limit. For those weights that are less than or equal to the maximum weight value attainable based on the bit budget (e.g., the scaling factor times $2^7$ for 8 bit signed fixed point integer values), no correction value may be required. For those weights that are greater than the maximum weight value (e.g., such that they have non-zero a most significant bit at a position of one more than the number of bits in the final bit budget (e.g., at the eighth bit for 8 bit signed fixed point integer values), a correction value may be added to the corrections list. For example, if a weight's most significant bit is non-zero, the most significant bit may be added as a correction value in the corrections list. Furthermore, the corrections list may include indices of the node and weight for each correction value for identification purposes.

As discussed, the score may be corrected based on the applicable correction values (e.g., those correction values associated by the indices to the node) to generate a corrected biased score for the node. The output of the node may then be generated based on the corrected biased score. For example, for hidden layers of the neural network, an activation function may be applied to the corrected biased score to generate the output. For example, the activation function may be a sigmoid activation function and the output may be an 8 bit unsigned fixed point integer value having 8 bits for the fraction part that is passed to nodes of the next layer of the neural network. For an output layer of the neural network, for example, the output of the node may be the corrected biased score itself.

The discussed neural network may be any suitable neural network such as an artificial neural network, a deep neural network, a convolutional neural network, or the like. Furthermore, the neural networks described herein may be provided in any suitable implementation such as speech recognition, image processing, optical character recognition, or the like. Examples discussed herein are typically related to speech recognition implementations, however, as discussed, the described neural networks may be provided in any suitable system. In speech recognition examples, the input to the neural network may include a stack of feature vectors attained from time windows of a speech recording and the output from the neural network may include classification scores or output classifications such as acoustic classification values, which may be used to identify textual elements of the speech recording.

FIG. 1 is an illustrative diagram of an example setting 100 for providing speech recognition, arranged in accordance with at least some implementations of the present disclosure. As shown in FIG. 1, setting 100 may include a user 101 providing speech 103 for evaluation by device 102. For example, device 102 may provide speech recognition such that speech 103 may be translated into text or textual elements such as words, sentences, n-grams, or the like. As shown, in some examples, a speech recognition system may be implemented via a device such as device 102. As illustrated, in some examples, device 102 may be a smartphone. However, device 102 may be any suitable device such as a computer, a laptop, an ultrabook, a tablet, or the like. In some examples, device 102 may be a wearable device such as a smart watch or smart glasses or the like. In other examples, speech recognition may be provided via a system remote to device 102 such as a server or servers in a cloud speech recognition system. In some examples, speech 103 may be received via a microphone 104 of device 102 (illustrated on a bottom of device 102). In other examples, speech 103 may be received as a pre-recording of speech or the like. Furthermore, in some examples, the textual elements may be provided to user 101 via a display 105 of device 102. In other examples, the textual elements may be saved to a memory of device 102 or to a remote cloud memory or the like. In some examples, device 102 may be described as a computing device as used herein.

Figure 2:
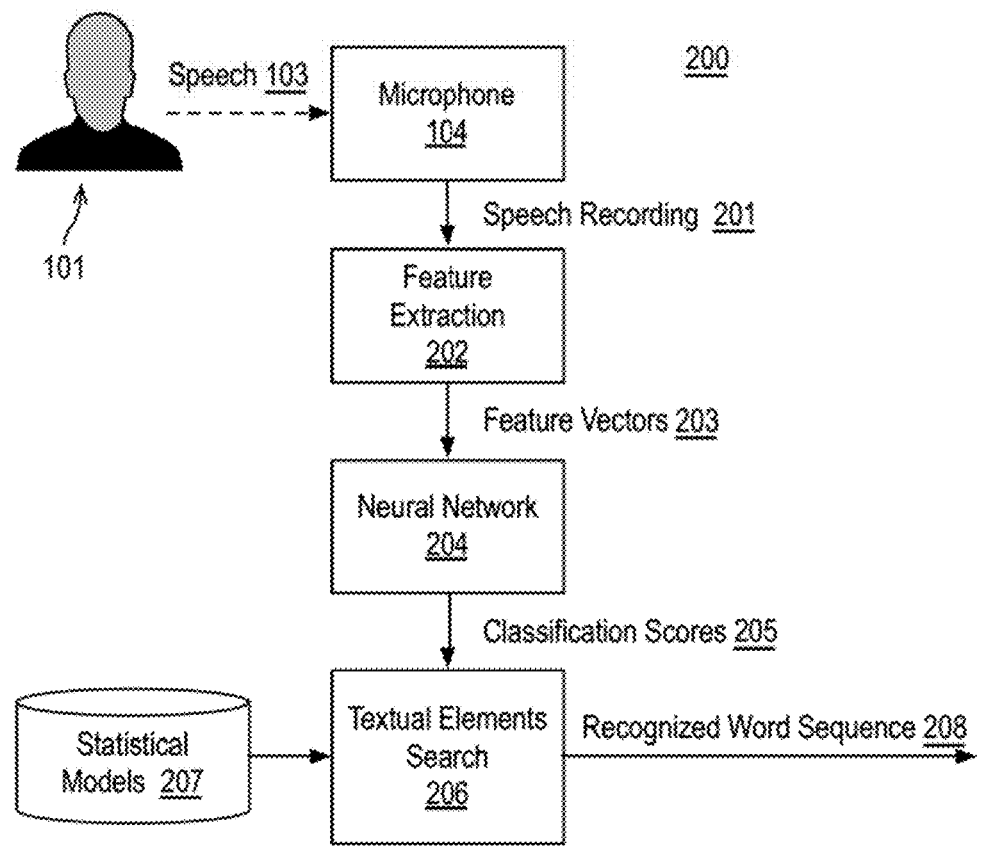
FIG. 2 is an illustrative diagram of an example system for providing speech recognition.

FIG. 2 is an illustrative diagram of an example system 200 for providing speech recognition, arranged in accordance with at least some implementations of the present disclosure. As shown in FIG. 2, system 200 may include microphone 104, a feature extraction module 202, a neural network 204, a textual elements search module 206, and statistical models 207. As shown, microphone 104 may receive speech 103 from user 101. Speech 103 may be issued by user 103 and microphone 104 may receive speech 103 (e.g., as sound waves in the air) and convert speech 103 to an electrical signal such as a digital signal to generate speech recording 201. For example, speech recording 201 may be stored in memory (not shown in FIG. 2). In other examples, speech recording 201 may be pre-recorded and speech recording 201 may be received by system 200 via another device.

Feature extraction module 202 may receive speech recording 201 from microphone 104 or from memory of system 200 and feature extraction module 202 may generate feature vectors 203 associated with speech 103. Feature vectors 203 may include any suitable features representing speech 103. For example, feature vectors 203 may be coefficients representing a power spectrum of the received speech or other spectral analysis coefficients or parameters. In some examples, feature vectors 203 may be Mel frequency cepstrum coefficients (MFCCs). Each feature vector of feature vectors 203 may be based on a time window of speech 103 (and speech recording 201). For example, the time window may be a certain time instance or recording duration (e.g., 10 or 20 milliseconds or the like) of speech recording 201 that slides across speech recording 201. Each feature vector of feature vectors 203 may thereby be determined based on an evaluation (e.g., a power spectrum analysis or the like) of the associated time window. Each feature vector may include any number of features. For example, features vectors 203 may include 10 to 20 features, 15 to 30 features, or 30 to 50 features, or the like. In an embodiment, each feature vector includes 23 features. Feature vectors 203 may include any suitable values. In some examples, feature vectors 203 may have a dynamic range from about −32 to about +32 (e.g., for MFCCs extraction). Other spectral analysis methods may provide different dynamic ranges. In some examples, features of feature vectors 203 are 16 bit fixed point integer values as is discussed further herein. Feature extraction module 202 may transfer feature vectors 203 to neural network 204 and/or a memory of system 200.

Neural network 204 may receive feature vectors 203 from feature extraction module 202 or from memory. Neural network 204 may take as input to neural network 204 (e.g., either via a pre-processor, not shown, or via neural network 204 itself) a feature vector or a stack of feature vectors 203. For example, the stack of feature vectors may include a current feature vector and a predetermined number of feature vectors preceding and/or succeeding the current feature vector. In an embodiment, the stack of feature vectors 203 includes the current feature vector, 5 preceding feature vectors, and 5 succeeding feature vectors for a stack of 11 feature vectors. As discussed, in some examples, each feature vector includes 23 features. In examples where a stack includes 11 feature vectors each having 23 features, the number of inputs to neural network 204 may be 253 inputs (e.g., 23×11 inputs). In such examples, neural network 204 may have an input layer including 253 nodes or neurons (e.g., a number of input layer nodes equal to the number of inputs to neural network 204). Such a stack of feature vectors may be provided to neural network 204 at each time instance (e.g., for each time window as discussed above). For each time instance, neural network 204 may determine classification scores 205. For example, classification scores 205 may include classification scores for each evaluated time instance of speech 103 (and speech recording 201) such that the classification scores include the outputs from an output layer of neural network 204. Classification scores 205 may include any suitable number of values for each time instance and classification scores 205 may be associated with any decoding or search model. In an embodiment, classification scores 205 include about 5,000 values. In an embodiment, classification scores 205 are associated with the states of statistical models 207. For example, statistical models 207 may include Hidden Markov Models (HMMs) and classification scores 205 associated with each time instance may each be associated with an HMM active state (e.g., all HMM models used in a particular system may have a total of about 5,000 states). In other examples, classification scores 205 may include scores for all states (e.g., not just active states) for the associated HMM models. For example, active states may include states having a cost of reaching them less than a predetermined threshold. The output layer of neural network 204 may include as many outputs as states of the implemented statistical model (e.g., HMM states). As shown, neural network 204 may transfer classification scores 205 to textual elements search module 206 and/or to a memory of system 200.

As discussed, in some examples, neural network 204 may generate classification scores associated with each time instance of speech recording 201. In other examples, neural network 204 may only evaluate a portion of the network at each time instance. For example, the output layer of neural network 204 may only be evaluated (and classification scores 205 may only be provided) when an active search is being performed by textual elements search module 206. In such examples, most likely textual element search module 206 may provide an active/inactive signal (not shown) to neural network 204. During the active signal, neural network 204 may generate outputs from the output layer and, during the inactive signal, neural network 204 may not generate outputs from the output layer and optionally from other layers of neural network 204.

Continuing with FIG. 2, textual elements search module 206 may receive classification scores 205 from neural network 204 or from memory. Textual elements search module 206 may decode classification scores 205 and search for a most likely textual elements and/or recognized word sequence match. As shown, in some examples, textual elements search module 206 may provide a recognized word sequence 208 as an output. Recognized word sequence 208 may be stored to a memory of system 200 and/or displayed to user 101 via display 105 or the like. In some examples, recognized word sequence 208 may be provided to another module or software application or the like for use by the module or software application. Recognized word sequence 208 or textual elements as used herein may include any suitable sequence of words, sub-word units, n-grams, syllables, letters, or the like. As shown, textual elements search module 206 may generate recognized word sequence 208 based on classification scores 205 (e.g., acoustic scores) and statistical models 207, which may be stored in a memory of system 200 and may be provided to textual elements search module 206 as shown in FIG. 2. Statistical models 207 may include any suitable models for word sequences or textual elements such as words, sub-word units, n-grams, syllables, letters, or the like. In an embodiment, statistical models 207 are Hidden Markov Models.

As discussed, textual elements search module 206 may use classification scores 205 to determine recognized word sequence 208. For example, textual elements search module 206 may use classification scores 205 from time instances of speech recording 201 (as discussed) on an ongoing basis to determine recognized word sequence 208. Textual elements search module 206 may thereby place classification scores 205 in a temporal context such that recognized word sequence 208 may be determined over time based on classification scores 205 from multiple time instances being evaluated over time in various combinations to determine a most likely recognized word sequence 208.

As shown in FIG. 2, in some examples, neural network 204 may be implemented as part of a speech recognition system. However, neural network 204 may be implemented in any suitable system such as perceptual computing systems, machine learning systems, cognitive computing systems, image processing systems, or optical character recognition systems or the like. Furthermore, neural network 204 and/or statistical models 207 may be pre-trained based on training sets or the like prior to implementation via system 200 to determine weights and/or biases of neural network. In some examples, pre-training may be implemented via system 200 itself. Also, as is discussed further herein, in some examples, weights of neural network 204 may be converted to fixed point integer values having an associated scaling factor and correction values may be determined for some of the converted weights prior to implementation via system 200. In some examples, weight conversions and correction value determinations may be performed via system 200 itself. In other examples, any of the pre-training, the weight conversions, or the correction value determinations may be performed by a separate system such that system 200 implements the determined weights, biases, and correction values.

Both the implementation of neural network 204 and the implementation of textual elements search module 206 may be computationally intensive. As discussed herein, the computational load of neural network 204 may be lessened via the implementation of fixed point integer value weights and corresponding correction values. Furthermore, such techniques may decrease the memory transfer load of system 200 saving battery life, which may be particularly advantageous in mobile device implementations.

Figure 3:
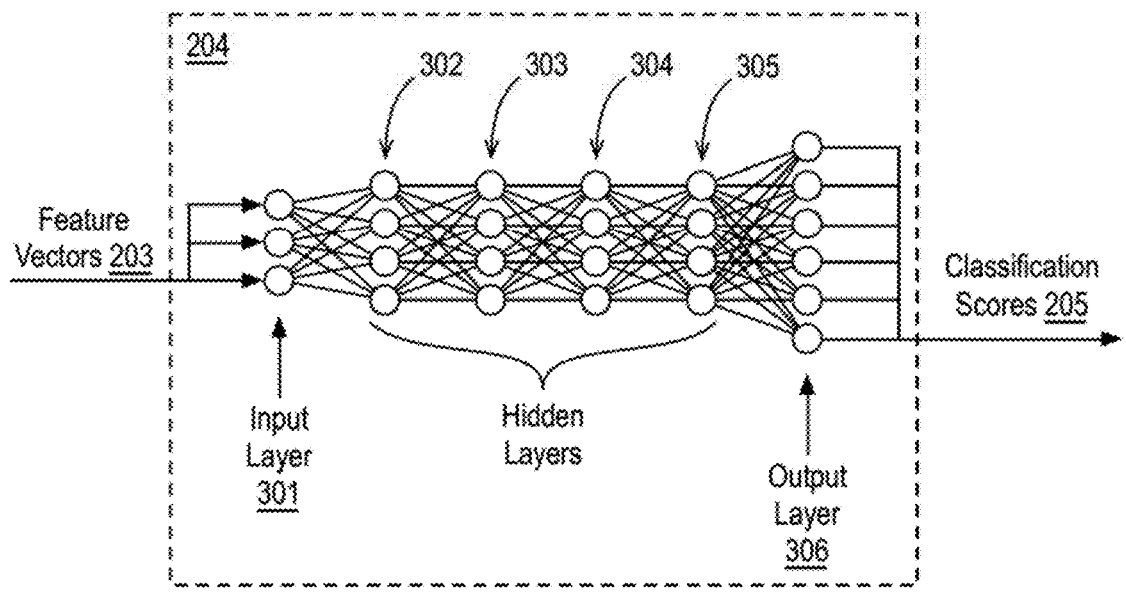
FIG. 3 is an illustrative diagram of example neural network.

FIG. 3 is an illustrative diagram of example neural network 204, arranged in accordance with at least some implementations of the present disclosure. Neural network 204 may include any suitable neural network such as an artificial neural network, a deep neural network, a convolutional neural network, or the like. As shown in FIG. 3, neural network 204 may include an input layer 301, hidden layers 302-305, and an output layer 306. Neural network 204 is illustrated as having three input nodes, hidden layers with four nodes each, and six output nodes for the sake of clarity of presentation. As discussed, input layer 301 may include multiple nodes. For example, input layer 301 may include a number of nodes equal to the number of elements in a feature vector for a time window multiplied by the number of feature vectors stacked for evaluation by neural network. In an embodiment, feature vectors have 23 elements and 11 feature vectors are stacked such that input layer 301 has 253 nodes. In other examples, feature vectors may have fewer or more elements and fewer or more feature vectors may be stacked. For example, input layer 301 may have 200 to 300 nodes, 300 to 400 nodes, or more nodes.

Furthermore, as in the illustrated example, neural network 204 may include four hidden layers 302-305. However, in other examples, neural network may include three, five, six, or more hidden layers. Hidden layers 302-305 may include any number of nodes. For example, hidden layers 302-305 may include 1,500 to 2,000 nodes, 2,000 to 2,500 nodes, or the like. In an embodiment, neural network 204 includes six hidden layers each having 2,048 nodes. In some examples, hidden layers 302-305 have the same number of nodes and in other examples, one or more layers may have different numbers of nodes. Output layer 306 may include any suitable number of nodes such that classification scores 205 include values for comparison and/or search to determine textual elements or recognized word sequences or the like. As discussed, in some examples, the applicable statistical models (e.g., statistical models 207) may include Hidden Markov Models (HMMs) and classification scores 205 may have a number of scores (for each time instance) equal to a number of HMM active states or a number of available HMM states. In some examples, output layer 306 may include a number of nodes equal to the number of available HMM states. For example, output layer 306 may include 3,500 to 4,500 nodes, 4,500 to 5,500 nodes, or 5,500 to 6,500 nodes or more. In an embodiment, output layer 306 includes 5,000 nodes. In the illustrated example, data flows from the left to the right from input layer 301, through hidden layers 302-305, and through output layer 306 as shown such that the output of input layer 301 is the input to hidden layer 302, the output of hidden layer 302 is the input to hidden layer 303 and so on, and such that the output of output layer 306 is the output of neural network 204 (e.g., classification scores 205). In some examples, such as in the illustrated example, every node in a layer may be connected to every node in the adjacent layer (e.g., the layers may be fully connected). For example, every node of input layer may be connected to every node of hidden layer 302, every layer of hidden layer 302 may be connected to every node of hidden layer 303, and so on. In other examples, some connections between nodes may not be made.

As discussed, feature vectors 203 may be provided to neural network 204 and neural network 204 may provide classification scores 205. Furthermore, classification scores 205 may be provided by output layer 306 of neural network 204. Exemplary details associated with determinations made at the nodes of neural network 204 (as well as the data types used for such determinations) are discussed further herein. In some examples, neural network 204 may be implemented for speech recognition in a test or implementation phase after neural network 204 has been trained in a training phase.

Such a training phase may determine weights for nodes of neural network 204, biases for nodes of neural network 204, and the like. In some examples, during cross-entropy training (e.g., during the training phase) of neural network 204, output layer 306 may have a softmax activation function that may be omitted during the implementation or test phase. In some examples, during implementation, outputs from output layer 306 may be scaled based on class probabilities prior to being provided as classification scores 205.

As discussed, during a training phase, weights and/or biases or the like may be determined for neural network 204. The weights for nodes of neural network 204 may be determined as any suitable number format or representation such as a 32 bit floating point representation. However, as discussed, implementing neural network 204 using such 32 bit floating point weights (or weights having similar number representations) may be computationally intensive and may cause problems with performance or battery life or the like. In the techniques discussed herein, weights may be converted to fixed point integer values having an associated scaling factor and corresponding correction values may be determined for some of the weights.

Figure 4:
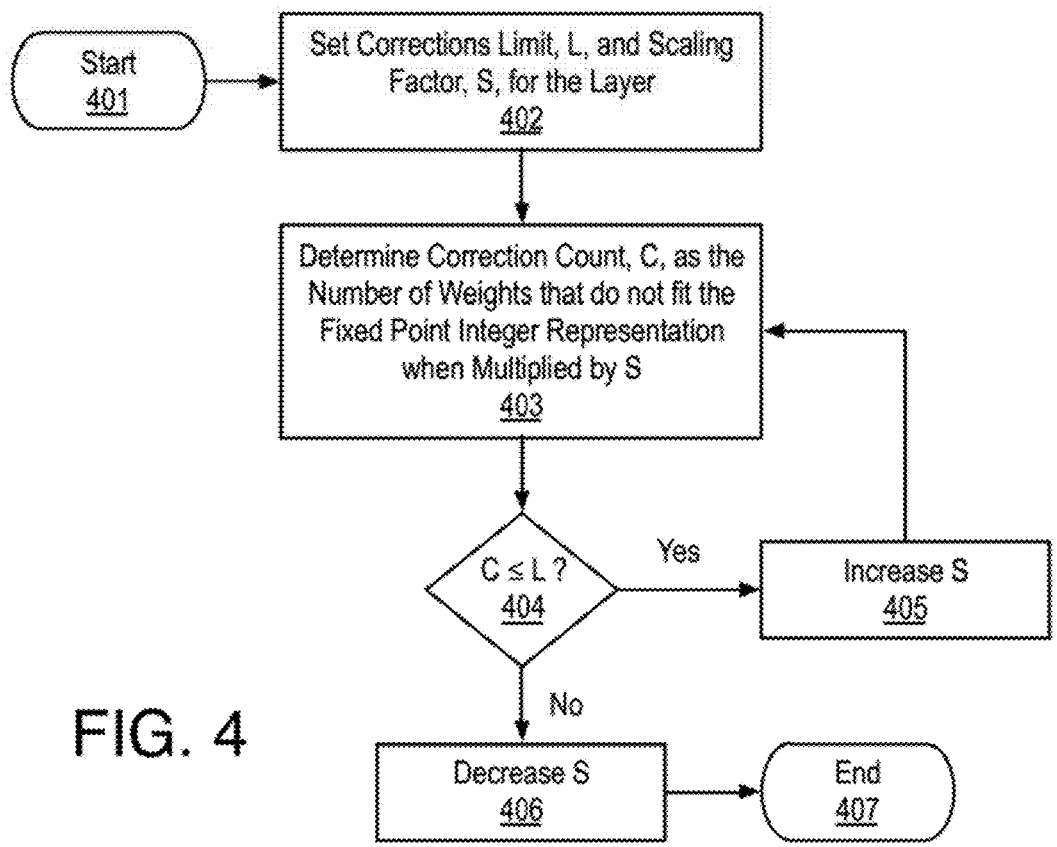
FIG. 4 is a flow diagram illustrating an example process for determining a scaling factor for a layer of a neural network.

FIG. 4 is a flow diagram illustrating an example process 400 for determining a scaling factor for a layer of a neural network, arranged in accordance with at least some implementations of the present disclosure. Process 400 may include one or more operations 401-407 as illustrated in FIG. 4. Process 400 may be performed by a device (e.g., device 102) itself prior to the implementation of neural network 204 or process 400 may be performed prior to the implementation via device 102 (e.g., process 400 may be performed by another device prior to implementation at device 102). Process 400 may be used to determine a scaling factor for a fixed point integer representation of weights of neural network 204. For example, fixed point integer values may have a data type such that the fixed point integer value is scaled by a scaling factor with the scaling factor being the same for all fixed point integer values of a type or classification. In some examples, a scaling factor may be determined for each layer of neural network 204 (e.g., input layer 301, hidden layers 302-305, or output layer 306), as needed, such that the scaling factor for one layer of neural network 204 may be different than the scaling factors of other layers. For example, process 400 may be repeated for each layer of neural network 204 for which weights are to be represented as fixed point integer values. In some examples, scaling factors may be determined for hidden layers 302-305 and output layer 306 but no scaling factor may be determined for input layer 301.

As shown, process 400 may begin at starting operation 401 and process 400 may continue at operation 402, "Set Corrections Limit, L, and Scaling Factor, S, for the Layer", where a corrections limit, L, and a scaling factor, S, may be set for a layer of the neural network (e.g., neural network 204). The corrections limit, L, may be any suitable limit on the number of weights for the layer that will or may be corrected (as is discussed further herein below). For example, weights that may be represented based on the scaling factor determined via process 400 and the fixed point integer value of the weight (e.g., the weight is less than or equal to the scaling factor times the fixed point integer value of the weight) may not need to be corrected. However, weights that cannot be represented based on the scaling factor determined via process 400 and the fixed point integer value of the weight (e.g., the weight greater than the scaling factor times the fixed point integer value of the weight) may need to be corrected via a correction value. For example, weights having a non-zero most significant bit during conversion may need to be corrected. Corrections limit, L, may be a maximum number of weights that may be corrected for the current layer of the neural network. For example, a larger corrections limit may provide for more granularity for the weights at the cost of greater computational requirements and a lower corrections limit may provide less computational requirements at the cost of lost granularity for the weights. In some examples, corrections limit, L, may be determined by multiplying the number of nodes in the layer by a factor that is between 3 and 5 inclusive (e.g., <3 ... 5>). Furthermore, an initial scaling factor may be set at operation 402. The initial scaling factor may be set to any suitable value. In an embodiment, the initial scaling factor, S, may be set to one.

Process 400 may continue at operation 403, "Determine Correction Count, C, as the Number of Weights that do not fit the Fixed Point Integer Representation when Multiplied by S", where a correction count, C, may be determined as a number of weights for the layer that do not fit the fixed point integer representation when multiplied by S. For example, as discussed, weights for a layer may be converted from 32 bit floating point values to fixed point integer values. In some examples, the weights may be converted to 8 bit signed fixed point integer vales (e.g., having a scaling factor, S). In such examples, 7 bits may be allotted to store the fixed point integer value such that the value may range from −127 to 128. Furthermore, as discussed, the current scaling factor, S, may be set to one. In such examples, the weights, when multiplied by the scaling factor must be less than or equal to 128 to not require correction and any of the weights, that when multiplied by the scaling factor are greater than 128 will require correction and are counted in correction count C.

Process 400 may continue at decision operation 404, "C≤L?", where it may be determined whether the correction count, C, is less than or equal to the corrections limit, L. As shown, if the correction count, C, is not less than or equal to the corrections limit, L, process 400 may continue at operation 405, "Increase S", where the scaling factor, S, may be increased by any suitable amount. For example, scaling factor, S, may be increased by a factor of 2 such that S=S×2). In such examples, process 400 may continue at operation 403, where, as discussed, a corrections count, C, may be determined (continuing the above example, the weights when multiplied by the scaling factor (now 2) must be less than 128 to not require correction). The corrections count, C, may, via continued iterations as needed, be increased until the correction count, C, is greater than the corrections limit, L, as discussed with respect to decision operation 404 and process 400 may continue at operation 406, "Decrease S", where the scaling factor, S, may be decreased by the amount the scaling factor is increased by at operation 405. For example, scaling factor, S, may be decreased by a factor of 2 at operation 406 such that S=S/2. As shown, process may, subsequent to operation 406, end at ending operation 407.

As discussed, process 400 may provide a scaling factor for a layer of neural network 204. Furthermore, process 400 may provide a correction count, C, for the layer of neural network 204. Process 400 may be repeated for any layers of neural network 204 for which a conversion of weights to a fixed point integer values may be desired. In some examples, process 400 may be repeated for all layers of neural network 204. In some examples, process 400 may be repeated for all of hidden layers 302-305 and for output layer 306. In such examples, weights of input layer 301 may not be converted to fixed point integer values. Furthermore, process 400 may produce a scaling factor that as a maximum scaling factor value that provides a corrections count for the neural network layer that is just less than a predetermined corrections limit (e.g., corrections limit, L).

Figure 5:
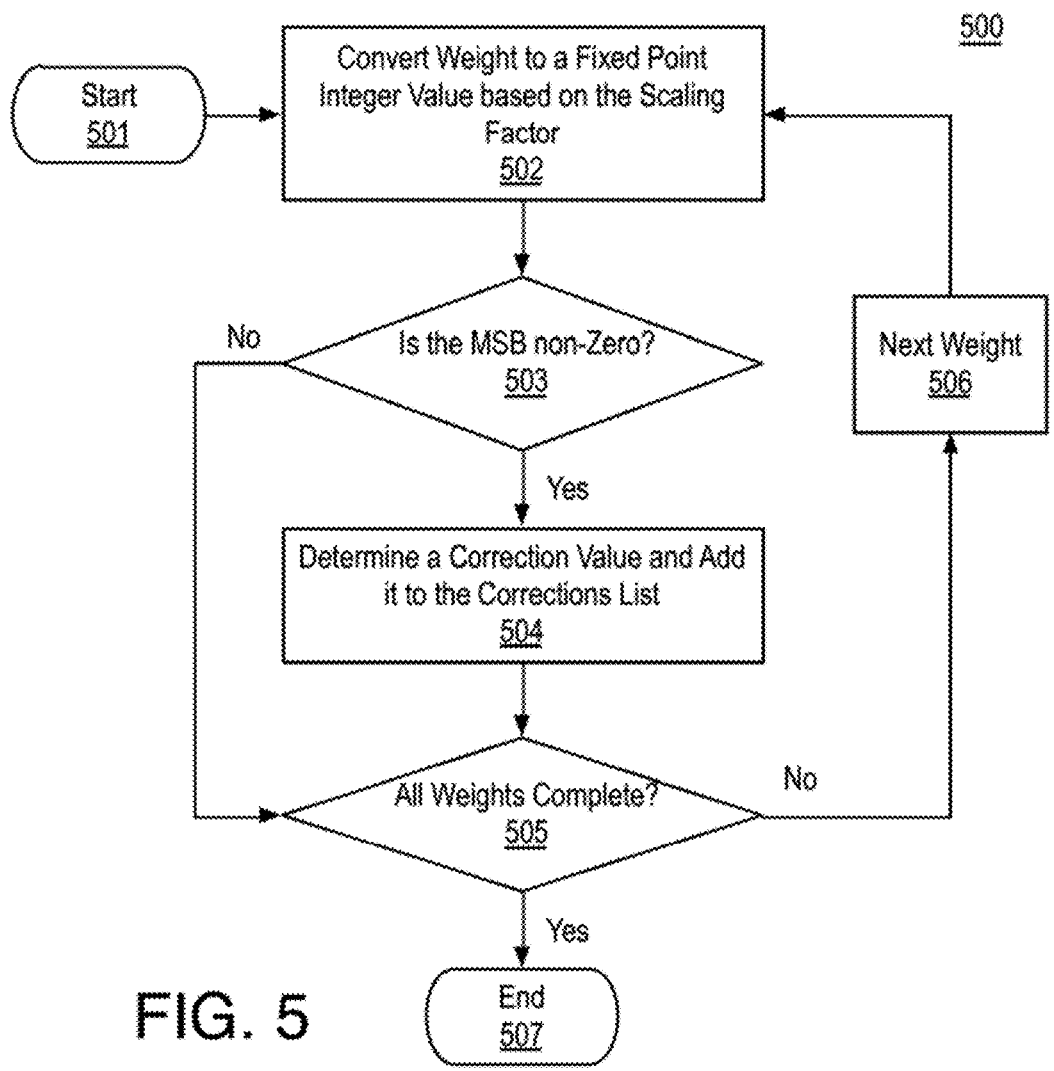
FIG. 5 is a flow diagram illustrating an example process for converting weights of a layer of a neural network to fixed point integer values based on a scaling factor and generating correction values for one or more of the weights.

FIG. 5 is a flow diagram illustrating an example process 500 for converting weights of a layer of a neural network to fixed point integer values based on a scaling factor and generating correction values for one or more of the weights, arranged in accordance with at least some implementations of the present disclosure. Process 500 may include one or more operations 501-507 as illustrated in FIG. 5. As discussed with respect to process 400, process 500 may be performed by a device (e.g., device 102) itself prior to the implementation of neural network 204 or process 500 may be performed prior to the implementation via device 102 (e.g., process 500 may be performed by another device prior to implementation at device 102). Process 500 may be used to determine fixed point integer values for weights of neural network 204 based on a scaling factor such as a scaling factor determined based on process 400. Furthermore, process 500 may be used to generate correction values for weights that do not fit the fixed point integer representation when multiplied by the scaling factor as discussed with respect to FIG. 4. In some examples, the correction values may be implemented via a corrections list, which may be generated based on process 500.

In some examples, weights may be determined using process 500 based on a scaling factor associated with a layer of neural network 204 (e.g., one of input layer 301, hidden layers 302-305, or output layer 306), as needed, such that the scaling factor for one layer of neural network 204 may be different than the scaling factors of other layers. For example, process 500 may be repeated for each layer of neural network 204 for which weights are to be represented as fixed point integer values. Furthermore, the corrections list generated by process 500 may have a number of entries equal to the correction count for a layer as determined via process 400.

As shown, process 500 may begin at starting operation 501 and process 500 may continue at operation 502, "Convert Weight to a Fixed Point Integer Value based on the Scaling Factor", where a weight (e.g., a first weight of the neural network layer) may be converted to a fixed point integer value. For example, a weight represented as a 32 bit floating point value may be converted to an 8 bit signed integer value. Furthermore, process 500 may perform operation 502 together with decision operation 503, "Is the MSB non-Zero?", where a determination may be made as to whether a most significant bit of the weight is non-zero. In an embodiment, the 32 bit floating point value may first be converted to a 16 bit signed integer value by multiplying the 32 bit floating point value by the scaling factor and rounding off the result of the multiplication to the 16 bit signed integer value. Then, the 16 bit signed integer value may be used to determine the 8 bit signed integer value as the modulo of the 16 bit signed integer value by 128. Furthermore, the 16 bit signed integer value may be used to determine whether a most significant bit of the weight is non-zero. For example, the most significant bit may be non-zero if the most significant bit of an 8 bit integer value determined by dividing the 16 bit signed integer value by 128 is non-zero. If the most significant bit is non-zero, process 500 may continue at operation 504, "Determine a Correction Value and Add it to the Corrections List", where a correction value may be determined for the weight and the correction value may be added to the corrections list. For example, the correction value may be a value associated with the most significant bit (e.g., the non-zero most significant bit determined at decision operation 503). Furthermore, the correction value for the weight may be added to the corrections list along with weight indices that indicate which weight in the layer of the neural network the correction value is associated with. For example, the indices may indicate the node of the current layer and the input to the node for the weight (e.g., if the node is the $i^{th}$ node of the layer and the weight is associated with the $j^{th}$ input to the $i^{th}$ node, the indices may be i and j for the correction value).

Process 500 may continue at decision operation 505, "All Weights Complete?", where a determination may be made as to whether every weight in the current layer has been converted. If not, process 500 may continue at operation 506, "Next Weight", where the next weight may be converted and, if needed, provided a correction value via operations 502 and 503 as discussed. Returning to operation 505, if all weights have been converted, process 500 may end at ending operation 507. As discussed, process 500 may convert weights for a layer of a neural network to fixed point integer values such as 8 bit signed fixed point integer values and process 500 may generate a corrections list for weights requiring correction values. Process 500 may be repeated for any or all layers of a neural network such as neural network 204. Furthermore, pseudo-code (1) as follows provides an example process for converting weights to fixed point integer values and for generating correction values.

```
Pseudo-code (1):
Input:
    float_weight - matrix of layer weights represented as floating point
    values
        (number of nodes in layer = number of columns in matrix)
        (number of inputs each node has = number of rows in matrix)
    scale factor S
Output:
    int8_weights - matrix of layer weights represented as 8 bit signed
    integer values
    corrections - list of corrections
Each correction in the list of corrections stores:
    node index
    input index
    correction value
Process:
    For each node n_i in layer
    For each input in_k of node
    {
        int16 w = round(float_weight[i][k] * S);
        int8_weight[i][k] = w % 128;
        int8 msb=w/128;
        if(msb <> 0)
        {
            corrections.add(i,k,msb);
        }
    }
```

As discussed, weights may be converted to fixed point integer values such as 8 bit signed fixed point integer values having an associated scaling factor for one or more layers of a neural network. Such weights may reduce computational complexity and memory access requirements for the system implementing the neural network. Furthermore, as discussed, such weights may be implemented at nodes of the neural network.

Figure 6:
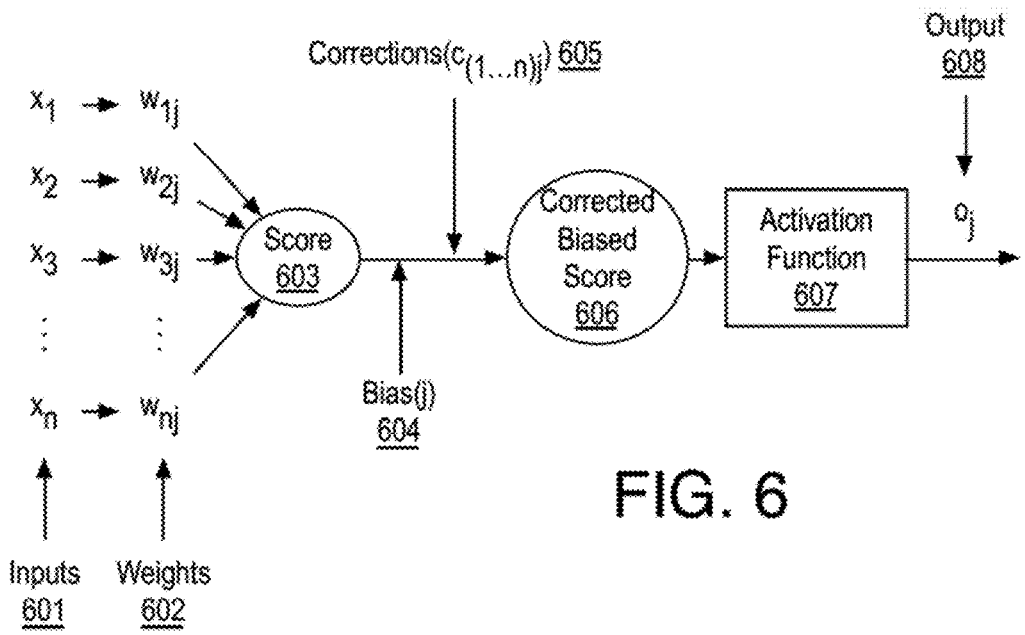
FIG. 6 is an illustrative diagram of an example hidden layer node.

FIG. 6 is an illustrative diagram of an example hidden layer node 600, arranged in accordance with at least some implementations of the present disclosure. For example, hidden layer node 600 may be any node in hidden layers 302-305 of neural network 204. As shown in FIG. 6, hidden layer node 600 may receive inputs 601 (e.g., $x_1, x_2, x_3, \ldots x_n$) and weights 602 (e.g., $w_{1j}, w_{2j}, w_{3j}, \ldots w_{nj}$) and hidden layer node 600 may provide output 608 (e.g., $o_j$). For example, each of inputs 601 may be received from each of the nodes in the layer preceding the layer of hidden layer node 600. For example, if hidden layer node 600 is a node of hidden layer 303, inputs 601 may be received from each node of hidden layer 302 such then input $x_i$ is from the $i^{th}$ node of hidden layer 302. As shown, n inputs 601 may be provided such that the previous layer (e.g., hidden layer 302 in the example) includes n nodes. Furthermore, weights 602 may be provided such that each weight is associated with hidden layer node 600 and inputs 601. For example, weights 602 may be received (e.g., from memory) such that weight $w_{ij}$ is associated with node j (e.g. hidden layer node 600) and the $i^{th}$ node of the previous layer. For example, if hidden layer node 600 is a node of hidden layer 303, hidden layer 303 may include m nodes such that hidden layer node 600 is the $j^{th}$ node of hidden layer 303, and each of the m nodes receives n inputs (e.g., hidden layer 302 has n nodes).

Also as shown in FIG. 6, hidden layer node 600 may receive a bias 604 (e.g., bias(j)). Continuing the above example, bias 604 may be the bias for node j (e.g., hidden layer node 600) of hidden layer 303 such that each hidden layer node of hidden layer 303 is provided with a bias (e.g., biases 1, 2, ... j, ... m). Furthermore, hidden layer node 600 may receive one or more correction values 605 (e.g., corrections($c_{(1 \ldots n)j}$). Correction values 605 may be associated with weights 602 such that correction values 605 provide correction values for those weights that require correction as discussed herein. For example, some of weights 602 may have correction values 605 while some of weights 602 may not have correction values. For example, correction values 605 may be determined by evaluating or accessing a corrections list. The corrections list may be generated as discussed with respect to process 500 for example. In an embodiment, the corrections list may be accessed by a processor (e.g., a central processing unit or the like). As discussed, the corrections list may include indices such as node indices and input indices such that correction values 605 may be determined and applied based on the indices. For example, correction values 605 may be attained for hidden layer node 600 such that all correction values having a node index of j are attained and correction values 605 may be applied such that those having input indices (e.g., one or more of 1, 2, ... n) may be applied to the appropriate inputs 601.

Continuing with reference to FIG. 6, hidden layer node 600 may generate a score 603 based on inputs 601 and weights 602. For example, score 603 may be determined as a sum of products of inputs 601 and weights 602 such that score 603 may be a weighted sum of inputs 601. For example, weights 602 may include 8 bit signed integer values with an associated scaling factor as discussed herein and inputs 601 may be 8 bit unsigned integer values having 8 bits for the fraction part. For example, activation functions applied by nodes of the previous neural network layer (e.g., in analogy to activation 607 as is discussed further below) may normalize inputs 601 (e.g., outputs from the previous layer) to values in the range of 0 to 1 inclusive (e.g., <0 ... 1>) such that all the bits of the unsigned 8 bit unsigned integer values may be allocated to the fraction part. As discussed, score 603 may be determined as a sum of products of inputs 601 and weights 602. In an embodiment, score 603 may be determined as or converted to a 32 bit integer value with a scaling factor of $2^{24}$. In some examples, score 603 may be determined as shown in Equation (1):

$$net_j = \sum_{i=1 \ldots n} x_i \cdot w_{ij} \quad (1)$$

where $net_j$ may be the score (e.g., score 603), x may be an input, w may be a weight, i may be a counter variable for the inputs to the node, and j may be a counter variable for the nodes of the neural network layer.

As shown, score 603 may be modified based on bias 604. Furthermore, one or more correction values 605 may be applied to score 603. As shown, in some examples, score 603 may be modified by bias 604 and correction values 605 may be applied. In other examples, only bias 604 or correction values 605 may be applied. Furthermore, bias 604 and correction values 605 may be applied in any order. Bias 604 may be applied to score 603 using any suitable technique or techniques. For example, bias 604 may be added to score 603, score 603 may be multiplied by bias 604, or score 603 may be modified by bias 604 based on a biasing function, thresholding, or the like. In an embodiment, bias 604 is a 32 bit integer value with a scaling factor of $2^{24}$. For example, a 32 bit integer value with a scaling factor of $2^{24}$ may be equivalent to a 32 bit fixed point integer representation with a 24 bit fraction part. In some examples, bias 604 may be characterized as a threshold. In some examples, bias 604 may be applied via activation function 607 as is discussed further below. Correction values 605 may applied to score 603 using any suitable technique or techniques. In some examples, correction values 605 may be applied to score 603 by multiplying a correction value by the input associated with correction value and adding the result to score 603. Such a technique may be applied for each correction value of correction values 605 for example. As shown, score 603 may be biased and corrected to generate a corrected biased score 606. In some examples, corrected biased score 606 may be a 32 bit fixed point integer value with a 24 bit fraction part. As discussed, in some examples, a bias may not have been applied and in such examples, corrected biased score 660 may be characterized as a corrected score.

As shown, an activation function 607 may be applied to corrected biased score 606 to generate output 608. Activation function 607 may include any suitable activation function such as a sigmoid function, a step function, a linear function, a softmax function, or the like, with a sigmoid function being particularly advantageous. As shown, output 608 may be provided to a subsequent layer of the neural network. As discussed, in some examples, output 608 may be provided to every node of the subsequent layer of the neural network. As discussed, in some examples, activation function 607 may include a sigmoid function. In some examples, activation function 607 may be applied as shown in Equation (2):

$$\varphi(mnet_j) = \frac{1}{1 + e^{-mnet_j}} \quad (2)$$

where mnetj may be the modified score (e.g., corrected biased score 606 or a corrected score) and φ may be an output of the sigmoid function. In some examples, the sigmoid function may provide an output (e.g., output 608) that is normalized to the range of 0 to 1 inclusive (e.g., <0 ... 1>). For example, φ may provide a normalized output 608. Such a normalization via a sigmoid activation function may provide a shrinking of the dynamic range to the described range of 0 to 1 inclusive. Furthermore, output 608 may be represented as an 8 bit unsigned integer values having 8 bits for the fraction part as discussed with respect to inputs 601. Such a representation may allow the multiplication described with respect to Equation (1) to be performed efficiently on 8 bit operands (e.g., inputs 601 and weights 602 may both be 8 bit integer values).

In some examples, output 608 may be determined as show with respect to Equation (3) as follows:

$$o_j = \varphi(mnet_j; \theta_j) \qquad (3)$$

where $o_j$ may be the output (e.g., output 608), $\varphi$ may be the activation function, $mnet_j$ may be a modified score (e.g., a corrected score with no bias applied) as discussed, and $\theta_j$ may be the bias (e.g., bias 604). As shown in Equation (3), output 608 may be a function of the modified score (e.g., corrected biased score 606).

Figure 7:
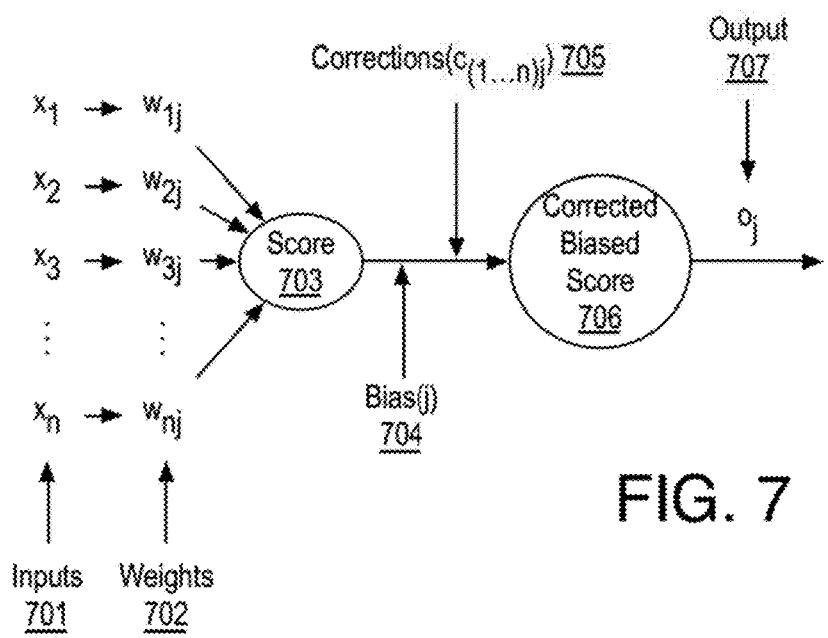
FIG. 7 is an illustrative diagram of an example output layer node.

FIG. 7 is an illustrative diagram of an example output layer node 700, arranged in accordance with at least some implementations of the present disclosure. For example, output layer node 700 may be any node in output layer 306 of neural network 204. As shown in FIG. 7, output layer node 700 may receive inputs 701 (e.g., $x_1, x_2, x_3, \ldots x_n$) and weights 702 (e.g., $w_{1j}, w_{2j}, w_{3j}, \ldots w_{nj}$) and output layer node 700 may provide output 707 (e.g., $o_j$). For example, inputs 701 may be received from each of the nodes in hidden layer 305 (e.g., the layer preceding output layer 306, please refer to FIG. 3). For example, inputs 701 may be received from each node of hidden layer 305 such then input $x_i$ is from the $i^{th}$ node of hidden layer 305 and hidden layer 305 includes n nodes. Furthermore, weights 702 may be provided such that each weight is associated with output layer node 700 and inputs 701. For example, weights 702 may be received (e.g., from memory) such that weight $w_{ij}$ is associated with node j (e.g. output layer node 700) of output layer 306 and the $i^{th}$ node of hidden layer 305 (e.g., the $i^{th}$ input from hidden layer 305).

Also as shown, output layer node 700 may receive a bias 704 (e.g., bias(j)). Continuing the above example, bias 704 may be the bias for node j (e.g., output layer node 700) of output layer 306 such that each hidden layer node of hidden layer is provided with a bias (e.g., biases 1, 2, . . . j, . . . m). Furthermore, output layer node 700 may receive one or more correction values 705 (e.g., corrections($c_{(1 \ldots nj)}$). Correction values 705 may be associated with weights 702 such that correction values 705 provide correction values for those weights that require correction as discussed herein. For example, some of weights 702 may have correction values 705 while some of weights 702 may not have correction values. For example, correction values 705 may be determined by evaluating or accessing a corrections list generated as discussed with respect to process 500. In an embodiment, the corrections list may be accessed by a processor (e.g., a central processing unit or the like) and the corrections list may include indices such as node indices and input indices such that correction values 705 may be determined based on the indices as discussed herein.

As shown in FIG. 7, output layer node 700 may generate a score 703 based on inputs 701 and weights 702. For example, score 703 may be determined as a sum of products of inputs 701 and weights 702. For example, weights 702 may include 8 bit signed integer values with an associated scaling factor as discussed herein and inputs 701 may be 8 bit unsigned integer values having 8 bits for the fraction part. For example, inputs 701 may be the outputs of activation functions applied by nodes of hidden layer 305 such as hidden layer node 600 discussed herein. For example, inputs 701 may be normalized to values in the range of 0 to 1 inclusive (e.g., <0 . . . 1>) such that all the bits of the unsigned 8 bit unsigned integer values may be allocated to the fraction part. In an embodiment, score 703 may be determined as or converted to a 32 bit integer value with a scaling factor of $2^{24}$. In some examples, score 703 may be determined as shown in Equation (1) above.

Continuing with FIG. 7, score 703 may be modified based on bias 704. Furthermore, one or more correction values 705 may be applied to score 703. In some examples, score 703 may be modified by bias 704 and correction values 705 may be applied and, in other examples, only bias 704 or correction values 705 may be applied. Furthermore, bias 704 and correction values 705 may be applied in any order. Bias 704 may be applied to score 703 using any suitable technique or techniques such as those discussed with respect to bias 604 of hidden layer node 600. In an embodiment, bias 704 is a 32 bit integer value with a scaling factor of $2^{24}$ and bias 704 is added to score 703. Correction values 705 may applied to score 703 using any suitable technique or techniques. In some examples, correction values 705 may be applied to score 703 by multiplying a correction value by the input associated with correction value and adding the result to score 703. Such a technique may be applied for each correction value of correction values 705 for example. As shown, score 703 may be biased and corrected to generate a corrected biased score 706. In some examples, corrected biased score 706 may be a 32 bit fixed point integer value with a 24 bit fraction part. As shown, corrected biased score 706 may be provided as an output of output layer node 700. For example, no activation function may be applied to corrected biased score 706. As shown with respect to FIG. 3, output 707 may be a part of classification scores 205. As discussed, in some examples output 707 may be associated with a state of a statistical model such as an HMM state.

Figure 8:
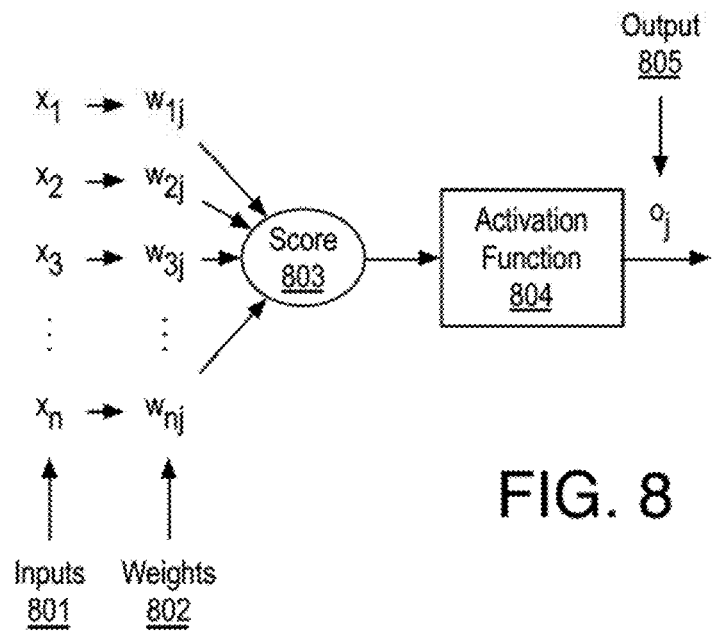
FIG. 8 is an illustrative diagram of an example input layer node.

FIG. 8 is an illustrative diagram of an example input layer node 800, arranged in accordance with at least some implementations of the present disclosure. For example, input layer node 800 may be any node in input layer 301 of neural network 204. As shown in FIG. 8, input layer node 800 may receive inputs 801 (e.g., $x_1, x_2, x_3, \ldots x_n$) and weights 802 (e.g., $w_{1j}, w_{2j}, w_{3j}, \ldots w_{nj}$) and input layer node 800 may provide output 805 (e.g., $o_j$). For example, inputs 801 may be received from feature extraction module 202 (please refer to FIG. 2) and may include a features of stacked feature vectors as discussed herein. For example, input $x_i$ may be the $i^{th}$ feature of the stacked feature vectors. Furthermore, weights 802 may be provided such that each weight is associated with input layer node 800 and inputs 801. For example, weights 802 may be received (e.g., from memory) such that weight $w_{ij}$ is associated with node j (e.g. input layer node 800) of input layer 301 and the $i^{th}$ input (e.g., feature) of the stacked feature vectors.

As shown in FIG. 8, in some examples, no correction values or bias may be applied at input layer node 800. For example, inputs 801 may be 16 bit signed or unsigned integer values and weights 802 may also be 16 bit signed or unsigned integer values. In other examples, a bias and/or correction values may be applied in analogy to those discussed with respect to FIGS. 6 and 7. As shown, input layer node 800 may generate a score 803 based on inputs 801 and weights 802. For example, score 803 may be determined as a sum of products of inputs 801 and weights 802. In an embodiment, score 803 may be determined as or converted to a 32 bit integer value with a scaling factor of $2^{24}$. In some examples, score 803 may be determined as shown in Equation (1) above. As shown, an activation function 804 may be applied to score 803 to generate output 805. Activation function 804 may include any suitable activation function as described herein such as a sigmoid function, a step function, a linear function, a softmax function, or the like, with a sigmoid function being particularly advantageous. As shown, output 805 may be provided to a subsequent layer of the neural network such as a first hidden layer (e.g., hidden layer 302). As discussed, in some examples, output 805 may be provided to every node of the subsequent layer of the neural network. As discussed, in some examples, activation function 804 may include a sigmoid function, which may be applied as shown in Equation (2) above. As discussed, in some examples, the sigmoid function may provide an output (e.g., output 805) that is normalized to the range of 0 to 1 inclusive (e.g., <0 . . . 1>) that may be represented as an 8 bit unsigned integer values having 8 bits for the fraction part. Such a representation may allow the multiplication described with respect to Equation (1) to be performed efficiently on 8 bit operands at hidden layer 302 for example.

As discussed herein, a neural network may generate classification scores (e.g., outputs) from feature vectors (e.g., inputs). The neural networks as discussed herein may be implemented via any suitable computing system such as handheld devices or cloud environments (e.g., via remote servers). Furthermore, the entire neural network may be implemented via the same processing device (e.g., a central processing unit, graphics processing unit, signal processor, or the like) or various portions of the neural network may be implemented via different processing devices.

Figure 9:
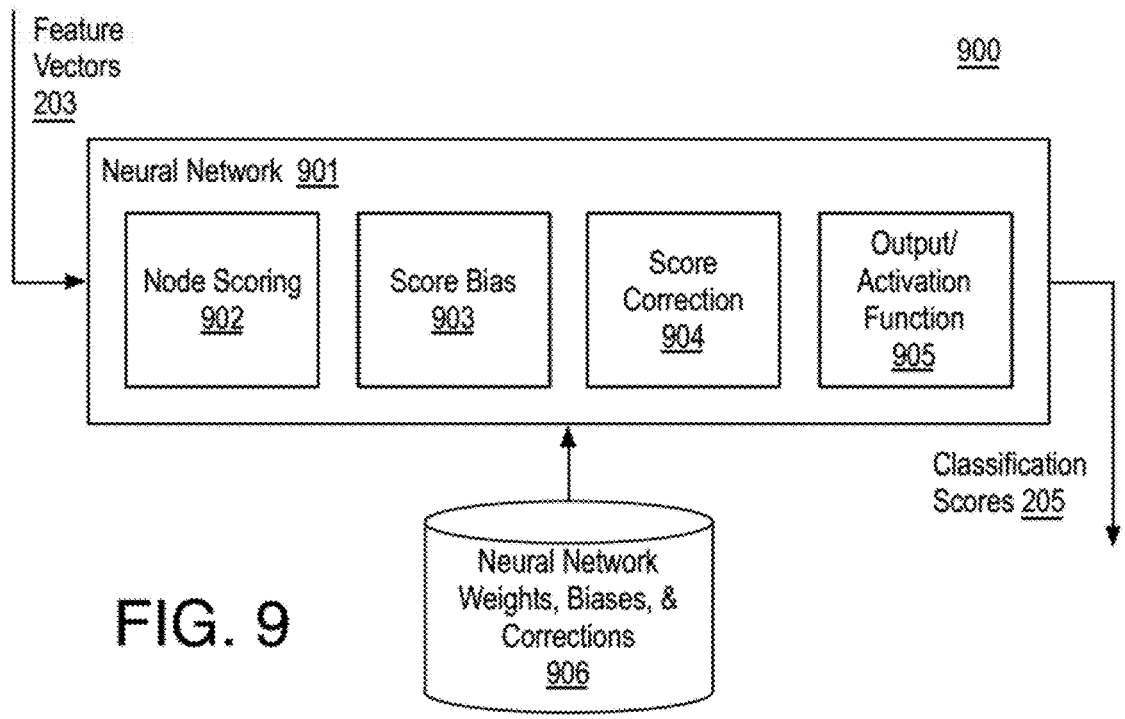
FIG. 9 is an illustrative diagram of an example system for generating classification scores from feature vectors.

FIG. 9 is an illustrative diagram of an example system 900 for generating classification scores 205 from feature vectors 203, arranged in accordance with at least some implementations of the present disclosure. As shown in FIG. 9, system 900 may include a neural network module 901 having a node scoring module 902, a score bias module 903, a score correction module 904, an output/activation function module 905, and neural network weights, biases, and corrections 906. In some examples, neural network module 901 may be implemented via a central processing unit or other processor as is discussed further herein. As discussed, in some examples, some or all of the modules of neural network module 901 may be implemented via different processors.

As shown, neural network module 901 may receive feature vectors 203 (e.g., via feature extraction module 203) and neural network weights, biases, and corrections 906, which may be stored in a memory of system 900. For example, a stack of feature vectors 203 may provide inputs to an input layer of a neural network implemented via neural network module 901. Furthermore, the neural network implemented via neural network module 901 may include any number of hidden layers and an output layer as discussed herein. Node scoring module 902 may determine node scores for layers of the neural network. For example, node scoring module 902 may determine scores 603, 703, and 803 as well as scores for the remainder of nodes of the neural network. In some examples, node scoring module 902 may determine scores using single instruction, multiple data (SIMD) instructions. In some examples, scores generated by node scoring module 902 may be 32 bit integer values with a scaling factor of $2^{24}$ as discussed. In other examples scores may be converted to 32 bit integer values with a scaling factor of $2^{24}$ via a conversion module (not shown).

Score bias module 903 and/or score correction module 904 may receive scores from node scoring module 902. Score bias module 903 may apply a bias such as biases 604, 704 to the scores generated via nodes scoring module 902. For example, score bias module 903 may attain biases for nodes via neural network weights, biases, and corrections 906 and score bias module 903 may apply the biases using any technique(s) discussed herein. Similarly, score correction module 904 may attain a corrections list via neural network weights, biases, and corrections 906 and score correction module 904 may determine correction values for a node based on indices of the corrections list and apply the correction values to determine corrected biased scores such as corrected biased score 606 and 706 and corrected biased scores for other nodes of the neural network.

Output/activation function module 905 may receive the corrected biased scores (e.g., for hidden layer nodes and output layer nodes) or stack of feature vectors (e.g., for input layer nodes) and output/activation function module 905 may generate an output based on the received corrected biased scores or scores. For example, for hidden layer nodes and input layer nodes, output/activation function module 905 may implement an activation function as discussed herein to generate an output such as an 8 bit unsigned integer value. In an embodiment, an activation function (e.g., activation function 607) may be applied to corrected biased scores (e.g., corrected biased score 606) for hidden layer nodes (e.g. hidden layer node 600) and an activation function (e.g., activation function 804) may be applied to scores (e.g., score 803) for input layer nodes (e.g. input layer node 800). Furthermore, for output layer nodes (e.g., output layer node 700), output/activation function module 905 may provide the corrected biased scores (e.g., corrected biased score 706) as the node output (e.g., without applying an activation function).

As shown, neural network 901 may provide (e.g., based on the outputs of output nodes) classification scores 205. In some examples, classification scores may be normalized via a normalization module (not shown) prior to being provided for further processing. As discussed, node scoring module 902 may provide node scoring for all layers of a neural network. Similarly, score bias module 903 may provide biasing, score correction module 904 may provide corrections (e.g., via correction values), and output/activation function module 905 may provide outputs for all layers of the neural network. Such processing may be performed in parallel and/or in serial to provide efficient implementation of the neural network.

FIG. 10 is a flow diagram illustrating an example process 1000 for processing a node of a neural network, arranged in accordance with at least some implementations of the present disclosure. Process 1000 may include one or more operations 1001-1004 as illustrated in FIG. 10. Process 1000 may form at least part of a neural network process such as a speech recognition process. By way of non-limiting example, process 1000 may form at least part of an automatic speech recognition process for an attained speech recording such as speech recording 201 as undertaken by systems 100, 200, or 900 as discussed herein. Further, process 1000 will be described herein in reference to system 1100 of FIG. 11.

Figure 11:
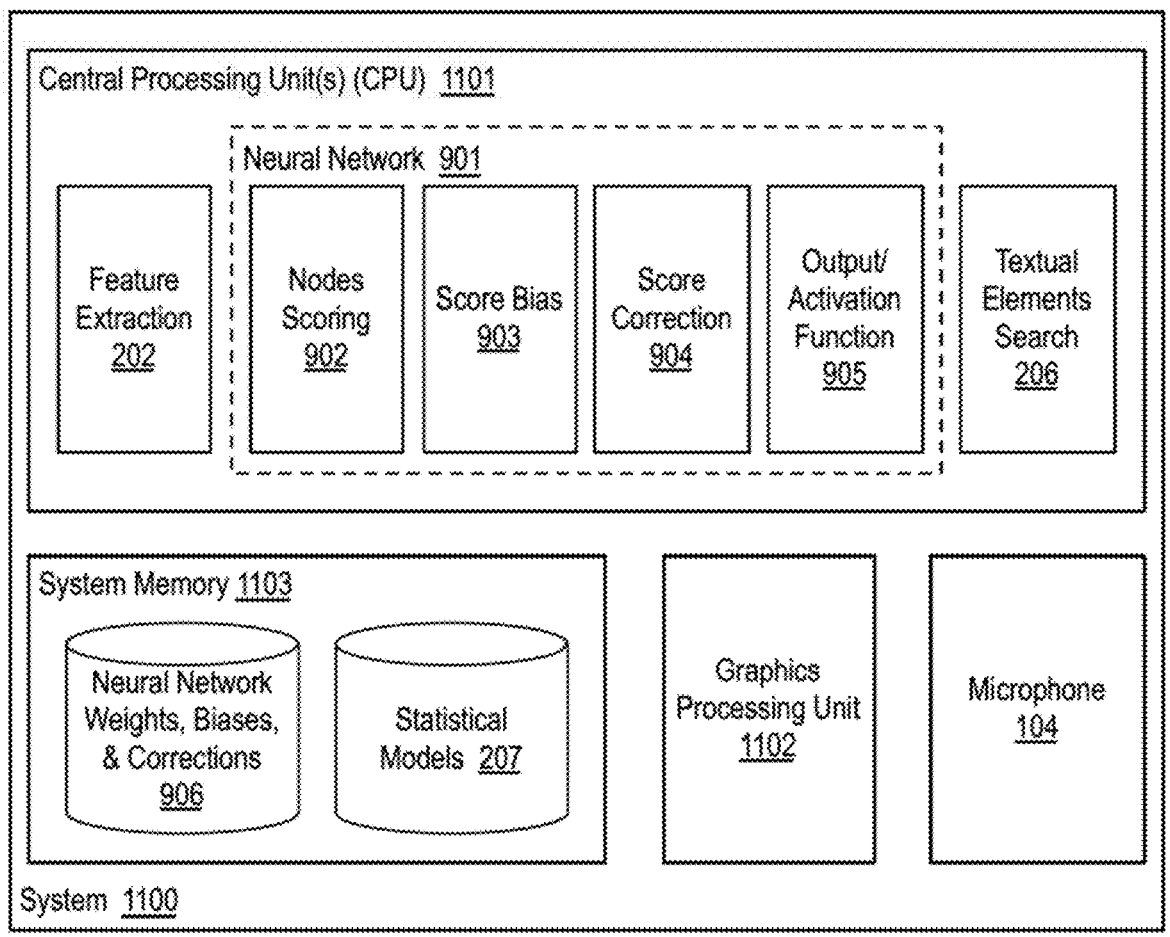
FIG. 11 is an illustrative diagram of an example system for providing speech recognition.

FIG. 11 is an illustrative diagram of an example system 1100 for providing speech recognition, arranged in accordance with at least some implementations of the present disclosure. As shown in FIG. 11, system 1100 may include one or more central processing units (CPU) 1101, a graphics processing unit (GPU) 1102, system memory 1103, and microphone 104. Also as shown, CPU 1101 may include feature extraction module 202, neural network module 901, and textual elements search module 206. Furthermore, neural network module 901 may include nodes scoring module 902, score bias module 903, score correction module 904, and output/activation function module 905. As shown, in the example of system 1100, system memory 1103 may store neural network weights, biases, and corrections 906 and statistical models 207. Furthermore, system memory 1103 may store any other data as discussed herein such as speech recordings, feature vectors, classification scores, recognized word sequences, or the like. Microphone 104 may include any suitable device or devices that may receive speech 103 (e.g., as sound waves in the air, please refer to FIG. 1) and convert speech 103 to an electrical signal such as a digital signal. In an embodiment, microphone converts speech 103 to speech recording 201. In an embodiment, speech recording 201 may be stored in system memory for access by CPU 1101 as discussed.

CPU 1101 and graphics processing unit 1102 may include any number and type of processing units that may provide the operations as discussed herein. Such operations may be implemented via software or hardware or a combination thereof. For example, graphics processing unit 1102 may include circuitry dedicated to manipulate data obtained from system memory 1103 or dedicated graphics memory (not shown). Furthermore, central processing units 1101 may include any number and type of processing units or modules that may provide control and other high level functions for system 1100 as well as the operations as discussed herein. System memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, system memory 1103 may be implemented by cache memory. As shown, in an embodiment, feature extraction module 202, neural network module 901, and textual elements search module 206 may be implemented via CPU 1101. In some examples, feature extraction module 202, neural network module 901, and textual elements search module 206 may be provided by software as implemented via CPU 1101. In other examples, feature extraction module 202, neural network module 901, textual elements search module 206, or one or more modules of neural network module 901 may be implemented via a digital signal processor or the like. In another embodiment, feature extraction module 202, neural network module 901, textual elements search module 206, or one or more modules of neural network module 901 may be implemented via an execution unit (EU) of graphics processing unit 1102. The EU may include, for example, programmable logic or circuitry such as a logic core or cores that may provide a wide array of programmable logic functions.

Returning to discussion of FIG. 10, process 1000 may begin at operation 1001, "Determine a Score for a Node of a Neural Network as the Sum of Products of Node Inputs and Node Weights", where a score for a node of a neural network may be determined as a sum of products of inputs to the node and weights associated with the node. For example, score 603 or score 703 may be determined for hidden layer node 600 or output layer node 700, respectively, by node scoring module 902 as implemented via CPU 1101. In some examples, the weights are fixed point integer values. For example, the weights may be 8 bit signed fixed point integer values having an associated scaling factor. In some examples, the inputs are 8 bit unsigned fixed point integer values.

For example the scaling factor for a layer of the neural network may be a maximum scaling factor value that provides a corrections count for the neural network layer that is less than a predetermined corrections limit. In some examples, the scaling factor may be determined via a scaling factor determination module (not shown) implemented via CPU 1101. Furthermore, the weights may be determined by converting floating point value neural network layer weights to the weights (e.g., 8 bit signed fixed point integer values). For example, the weights may be determined via a weights conversion module (not shown) implemented via CPU 1101. In some examples, in conjunction with converting the weights, a corrections list including correction values for weights and associated node and weight indices for the correction values may be generated for weights that are associated with 8 bit unsigned fixed point integer neural network layer weights having a non-zero most significant bit. For example, the corrections list may be generated via a corrections list generation module (not shown) implemented via CPU 1101.

Process 1000 may continue at operation 1002, "Modify the Score based on a Node Bias", where the score may be modified based on a node bias. For example, score 603 or score 703 may be modified based on node bias 604 or bias 704, respectively, by score bias module 903 as implemented via CPU 1101. For example, the node bias may be a 32 bit integer value with a scaling factor of $2^{24}$, which may modify a score that is also a 32 bit integer value with a scaling factor of $2^{24}$.

Process 1000 may continue at operation 1003, "Apply one or more Corrections to the Score based on Correction Value(s) associated with the Node Weights", where at least one correction may be made to the score based on at least one weight (e.g., of the weights of the node) having an associated correction value. For example, score 603 or score 703 may be corrected based on correction values 605 or correction values 705, respectively by score correction module 904 as implemented via CPU 1101. For example, a corrections list associated with the neural network layer including the node may be evaluated to determine the correction value. For example, the corrections list may have correction values (and indices) for neural network layer weights of the neural network layer. In some examples, the corrections list may include neural network layer weights for one neural network layers and, in other examples, the corrections list may include neural network layer weights for all of the neural network layers having correction values (e.g., hidden layers and output layers).

As shown, in some examples, a bias may be applied to the score and then one or more corrections may be applied. In other examples, the one or more corrections may be applied before the bias and, in yet other examples, the one or more corrections and the bias may be applied together. In any case, a corrected biased score may be generated. For example, the corrected biased score may be a 32 bit fixed point integer value.

Process 1000 may continue at operation 1004, "Generate a Node Output based on the Corrected Biased Score", where a node output may be generated based on the corrected biased score. For example, output 608 or output 707 may be generated based on corrected biased score 606 or corrected biased score 706, respectively, by output/activation function module 905 as implemented via CPU 1101. For example, output/activation function module 905 may generate output 608 for hidden layer node 600 by applying activation function 607 to corrected biased score 606. For example, the activation function may be a sigmoid function and the output may be an 8 bit unsigned fixed point integer value. In another example, output/activation function module 905 may generate output 707 for output layer node 700 by providing corrected biased score 706 as output 707.

Process 1000 may be repeated any number of times either in series or in parallel for any number of nodes of a neural network and/or for any number of inputs to the neural network. Process 1000 may provide for an processing at a node of a neural network via a device such as device 102 as discussed herein or via a server as part of a cloud computing platform or the like. Also as discussed herein, prior to such node processing in real-time, various components of the neural network may be pre-trained, biases and/or weights may be determined, weights may be converted to fixed point integer values, correction lists and/or correction values may be determined or the like via, in some examples, a separate system. As discussed, in some examples, process 1000 may be implemented via CPU 1101. In other examples, process 1000 (and the associated modules) may be implemented via a dedicated processor such as a co-processor or the like.

Furthermore, as discussed, process 1000 may be implemented as part of a speech recognition system. For example, speech 103 may be converted to speech recording 201 via microphone 104 of system 1100 and/or related circuitry. Feature vectors 203 may be determined or extracted based on speech recording 201 by feature extraction module 202 as implemented via CPU 1101. In some examples, feature extraction module 202 may be implemented via a digital signal processor (not shown) of system 1100. For example, feature vectors 203 may each be associated with a time window of speech recording 201. Feature vectors 203 (or a stack thereof) may be provided as input to neural network module 901 and neural network module 901 may implement neural network 204 or the like to generate classification scores 205 or output classifications as discussed herein such that the classification scores are based on the output from the node (e.g., output 608 or output 707 or the like). Based on classification scores 205, a sequence of textual elements such as recognized word sequence 208 may be determined. For example, textual elements search module 206 as implemented via CPU 1101 may determine recognized word sequence 208 by comparing classification scores 205 to statistical models 207 as attained via system memory 1103.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100, 200, 900, or 1100, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As discussed, techniques discussed herein, as implemented via a speech recognition system may provide for techniques that are less computationally intensive and require less memory movement. For example, the most significant part of the computational effort in neural network evaluation may be the transfer of neural network parameters to the computation engine and to summing up the weighted inputs for each node or neuron. The techniques discussed herein provide for 8 bit integer value (e.g., 8 bit signed integer value) weighting parameters, which require less memory storage. For example, the 8 bit signed integer value weighting parameters may be stored as a relatively small matrix and efficiently computed using SIMD instructions. Furthermore, a limited number of neural network weighting parameters with non-zero most significant bits may be stored as a list of correction values or parameters that may be determined independently using scalar instructions. Such correction values or parameters may ensure high classification accuracy.

---

Pseudo-code (2) as follows provides an example process for determining a biased corrected score as discussed herein.

Input:
    uint8_input - vector of output values of previous layer ( after sigmoid )
    int8_weights - matrix of layer weights represented as 8bit integer
        (number of nodes in layer = number of columns in matrix)
        (number of inputs each node has = number of rows in matrix)
    int32_bias - vector of bias values represented as fixed point number with 24 bit fraction part
    corrections[]- list of corrections
    number of corrections
    shift_to_2_24 - shift value required to adjust score to number with 24bit fraction part
Output
    int32_scores - classification (e.g., acoustic) scores vector - vector size is equal to number of output nodes
Process:
    Calculate_scores_using_SIMD
    For each score si value in scores vector
        int32_scores[i] = int32_scores[i] << shift_to_2_24 + bias[i];
    For each correction c in layer correction list
        int32_scores[c.node_index] +=
        ((int)uint8_input[c.input_index] * (int)c.value *
        128) << shift_to_2_24;

---

For example, the techniques discussed herein may combine the advantages of an 8-bit representation (e.g., small storage size, small memory bandwidth, efficient computation with SIMD instructions) with the high classification accuracy that may be achieved with a representation that would otherwise require more bits. For example, in speech recognition, word error rate (WER) is a commonly used evaluation metric. It represents the number of errors made by the speech recognizer relative to the number of spoken words in a test database. Smaller WERs correspond to a higher speech recognition accuracy.

In an example implementation, a word error rate (e.g., lower is better) comparison was made on a set of 849 utterances containing short text message dictation with a vocabulary of 200,000 words and a trigram language model. The results of word error rates for various systems are shown in Table 1. As shown, Table 1 contains the WER for example systems.

TABLE 1

Example Results Neural Networks

| System | Input Layer | Hidden Layers | Output Layer | WER |
|---|---|---|---|---|
| Neural Network with Floating Point Weights | 253 neurons | 4 × 1,204 neurons each | 3,952 neurons | 14.7% |
| Neural Network with 16 Bit Integer Weights | 253 neurons | 4 × 1,204 neurons each | 3,952 neurons | 14.7% |
| Neural Network with 8 Bit Integer Weights | 253 neurons | 4 × 1,204 neurons each | 3,952 neurons | 21.1% |
| Neural Network with 8 Bit Integer Weights with Correction Values | 253 neurons | 4 × 1,204 neurons each | 3,952 neurons | 14.7% |

As shown in Table 1, the neural network with 8 bit integer weights with correction values as described herein leads to a speech recognition accuracy level that is comparable to using weights represented as 16 bit integers or 32 bit float points. Such results may be attained using even a relatively small number of correction parameters. In some implementation, the parameter representation as discussed herein may add less than 4% in total size (e.g., for given neural network) as compared to pure 8-bit integer value weight representation with significantly better classification accuracy.

Figure 12:
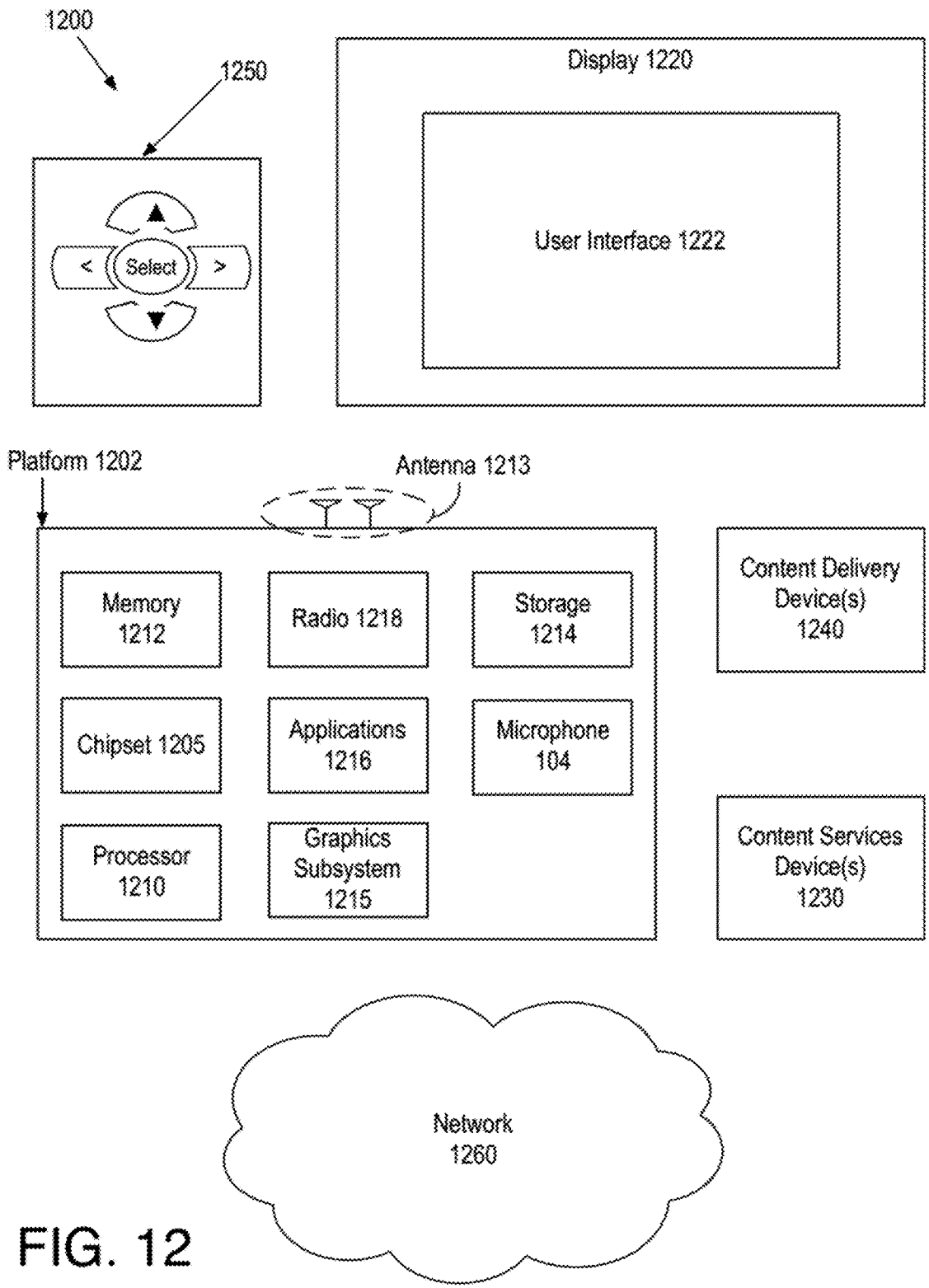
FIG. 12 is an illustrative diagram of an example system.

FIG. 12 is an illustrative diagram of an example system 1200, arranged in accordance with at least some implementations of the present disclosure. In various implementations, system 1200 may be a mobile system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart watch, smart glasses or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. As shown, in some examples, system 1200 may include microphone 104 implemented via platform 1202. Platform 1202 may receive speech such as speech 103 via microphone 104 as discussed herein. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
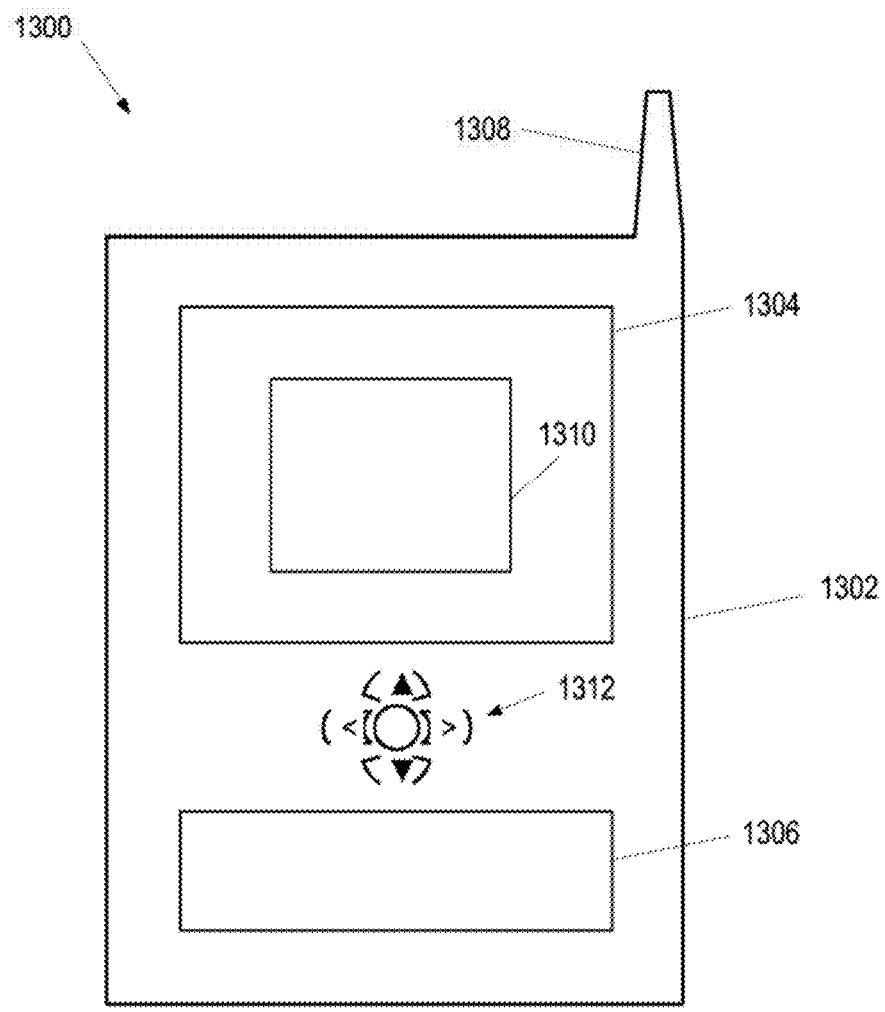
FIG. 13 illustrates an example device, all arranged in accordance with at least some implementations of the present disclosure.

As described above, system 1200 may be embodied in varying physical styles or form factors. FIG. 13 illustrates implementations of a small form factor device 1300 in which system 1300 may be embodied. In various embodiments, for example, device 1300 may be implemented as a mobile computing device a having wireless capabilities. A mobile computing device may refer to any device having a processing system and a mobile power source or supply, such as one or more batteries, for example. In some examples, device 1300 may include a microphone (e.g., microphone 104) and/or receive speech (e.g., speech 103)

for real time speech recognition via implementation of neural network as discussed herein.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing 1302, a display 1304, an input/output (I/O) device 1306, and an antenna 1308. Device 1300 also may include navigation features 1312. Display 1304 may include any suitable display unit for displaying information appropriate for a mobile computing device. Display 1304 may include a touchscreen region 1310 for receiving I/O commands. In some examples, touchscreen region 1310 may be substantially the same size as display 1304. I/O device 1306 may include any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for processing a node of a neural network comprises determining a score for the node of the neural network, wherein the score comprises a sum of products of inputs to the node and weights associated with the node, and wherein the weights comprise fixed point integer values, modifying the score based on a bias associated with the node, applying at least one correction to the score based on at least one weight of the weights having an associated correction value, and generating an output from the node based on the corrected biased score.

Further to the first embodiments, the weights comprise 8 bit signed fixed point integer values having an associated scaling factor.

Further to the first embodiments, the weights comprise 8 bit signed fixed point integer values having an associated scaling factor, wherein the neural network comprises a neural network layer including the node, and the method further comprises evaluating a corrections list associated with the neural network layer to determine the correction value, wherein the corrections list comprises correction values for one or more neural network layer weights of the neural network layer.

Further to the first embodiments, the weights comprise 8 bit signed fixed point integer values having an associated scaling factor, wherein the neural network comprises a neural network layer including the node, and the method further comprises evaluating a corrections list associated with the neural network layer to determine the correction value, wherein the corrections list comprises correction values for one or more neural network layer weights of the neural network layer, and determining the scaling factor for the neural network layer weights of the neural network layer as a maximum scaling factor value that provides a corrections count for the neural network layer that is less than a predetermined corrections limit, wherein the neural network layer weights comprise the weights associated with the node.

Further to the first embodiments, the weights comprise 8 bit signed fixed point integer values having an associated scaling factor, wherein the neural network comprises a neural network layer including the node, and the method further comprises evaluating a corrections list associated with the neural network layer to determine the correction value, wherein the corrections list comprises correction values for one or more neural network layer weights of the neural network layer, converting floating point value neural network layer weights to the neural layer network layer weights, wherein the neural network layer weights comprise 8 bit signed fixed point integer values, and generating the corrections list comprising the correction values for the one or more neural network layer weights and associated node and weight indices for the correction values, wherein the correction values are associated with 8 bit unsigned fixed point integer neural network layer weights having a non-zero most significant bit.

Further to the first embodiments, the weights comprise 8 bit signed fixed point integer values having an associated scaling factor, wherein the neural network comprises a neural network layer including the node, and the method further comprises evaluating a corrections list associated with the neural network layer to determine the correction value, wherein the corrections list comprises correction values for one or more neural network layer weights of the neural network layer, determining the scaling factor for the neural network layer weights of the neural network layer as a maximum scaling factor value that provides a corrections count for the neural network layer that is less than a predetermined corrections limit, wherein the neural network layer weights comprise the weights associated with the node and/or converting floating point value neural network layer weights to the neural layer network layer weights, wherein the neural network layer weights comprise 8 bit signed fixed point integer values and generating the corrections list comprising the correction values for the one or more neural network layer weights and associated node and weight indices for the correction values, wherein the correction values are associated with 8 bit unsigned fixed point integer neural network layer weights having a non-zero most significant bit.

Further to the first embodiments, the node comprises a hidden layer node and wherein generating the output from the node based on the corrected biased score comprises applying an activation function to the corrected biased score to generate the output.

Further to the first embodiments, the node comprises a hidden layer node and wherein generating the output from the node based on the corrected biased score comprises applying an activation function to the corrected biased score to generate the output, wherein the activation function comprises a sigmoid function and wherein the output comprises an 8 bit unsigned fixed point integer value.

Further to the first embodiments, the node comprises a hidden layer node and wherein generating the output from the node based on the corrected biased score comprises applying an activation function to the corrected biased score to generate the output, and/or wherein the activation function comprises a sigmoid function and the output comprises an 8 bit unsigned fixed point integer value.

Further to the first embodiments, the node comprises an output node and wherein generating the output from the node based on the corrected biased score comprises providing the corrected biased score as the output.

Further to the first embodiments, the corrected biased score comprises a 32 bit fixed point integer value.

Further to the first embodiments, modifying the score by the bias is performed prior to applying the at least one correction to the score.

Further to the first embodiments, the neural network comprises a speech recognition neural network and the method further comprises converting received speech to a speech recording, extracting feature vectors associated with time windows of the speech recording, providing the feature vectors as input to the neural network, generating classification scores from the speech recognition neural network based at least in part on the output from the node, and determining a sequence of textual elements based on the classification scores.

Further to the first embodiments, the neural network comprises a speech recognition neural network and the method further comprises converting received speech to a speech recording, extracting feature vectors associated with time windows of the speech recording, providing the feature vectors as input to the neural network, generating classification scores from the speech recognition neural network based at least in part on the output from the node, and determining a sequence of textual elements based on the classification scores, wherein the weights comprise 8 bit signed fixed point integer values having an associated scaling factor, wherein the inputs comprises 8 bit unsigned fixed point integer values, wherein the corrected biased score comprises a 32 bit fixed point integer value, wherein the node comprises a hidden layer node, wherein generating the output from the node based on the corrected biased score comprises applying a sigmoid activation function to the corrected biased score to generate the output, and wherein the output comprises an 8 bit unsigned fixed point integer value.

Further to the first embodiments, the neural network comprises a speech recognition neural network and the method further comprises converting received speech to a speech recording, extracting feature vectors associated with time windows of the speech recording, providing the feature vectors as input to the neural network, generating classification scores from the speech recognition neural network based at least in part on the output from the node, and determining a sequence of textual elements based on the classification scores, wherein the input to the neural network comprises a stack of feature vectors and wherein determining the sequence of textual elements comprises comparing the classification scores to statistical models.

Further to the first embodiments, the neural network comprises a speech recognition neural network and the method further comprises converting received speech to a speech recording, extracting feature vectors associated with time windows of the speech recording, providing the feature vectors as input to the neural network, generating classification scores from the speech recognition neural network based at least in part on the output from the node, and determining a sequence of textual elements based on the classification scores, wherein the weights comprise 8 bit signed fixed point integer values having an associated scaling factor, the inputs comprises 8 bit unsigned fixed point integer values, the corrected biased score comprises a 32 bit fixed point integer value, the node comprises a hidden layer node, generating the output from the node based on the corrected biased score comprises applying a sigmoid activation function to the corrected biased score to generate the output, and the output comprises an 8 bit unsigned fixed point integer value, and/or wherein the input to the neural network comprises a stack of feature vectors and wherein determining the sequence of textual elements comprises comparing the classification scores to statistical models.

In one or more second embodiments, a system for providing a neural network comprises a memory configured to store weights associated with a node of the neural network, wherein the weights comprise fixed point integer values, and a central processing unit coupled to the memory, wherein the central processing unit comprises node scoring circuitry configured to determine a score for the node of the neural network, wherein the score comprises a sum of products of inputs to the node and the weights associated with the node, score bias circuitry configured to modify the score based on a bias associated with the node, score correction circuitry configured to apply at least one correction to the score based on at least one weight of the weights having an associated correction value, and activation function circuitry configured to apply an activation function to the corrected biased score to generate an output from the node.

Further to the second embodiments, the weights comprise 8 bit signed fixed point integer values having an associated scaling factor.

Further to the second embodiments, the weights comprise 8 bit signed fixed point integer values having an associated scaling factor, wherein the neural network comprises a neural network layer including the node, and wherein the score correction circuitry is further configured to evaluate a corrections list associated with the neural network layer to determine the correction value, wherein the corrections list comprises correction values for one or more neural network layer weights of the neural network layer.

Further to the second embodiments, the weights comprise 8 bit signed fixed point integer values having an associated scaling factor, wherein the neural network comprises a neural network layer including the node, and wherein the score correction circuitry is further configured to evaluate a corrections list associated with the neural network layer to determine the correction value, wherein the corrections list comprises correction values for one or more neural network layer weights of the neural network layer.

Further to the second embodiments, the activation function comprises a sigmoid function and wherein the output comprises an 8 bit unsigned fixed point integer value.

Further to the second embodiments, the weights comprise 8 bit signed fixed point integer values having an associated scaling factor, wherein the inputs comprises 8 bit unsigned fixed point integer values, wherein the corrected biased score comprises a 32 bit fixed point integer value, wherein the node comprises a hidden layer node, wherein the activation function comprises a sigmoid activation function, and wherein the output comprises an 8 bit unsigned fixed point integer value.

Further to the second embodiments, the corrected biased score comprises a 32 bit fixed point integer value.

Further to the second embodiments, the score bias circuitry and the score correction circuitry are configured to modify the score based on the bias via the score bias circuitry prior to the score correction circuitry being apply the at least one correction to the score.

Further to the second embodiments, the system further comprises feature extraction circuitry configured to extract feature vectors associated with time windows of a speech recording and to provide the feature vectors as input to the neural network and textual elements search circuitry configured to receive classification scores from the neural network, wherein the classification scores are based at least in part on the output from the node, and to determine a sequence of textual elements based on the classification scores.

Further to the second embodiments, the system further comprises feature extraction circuitry configured to extract feature vectors associated with time windows of a speech recording and to provide the feature vectors as input to the neural network and textual elements search circuitry configured to receive classification scores from the neural network, wherein the classification scores are based at least in part on the output from the node, and to determine a sequence of textual elements based on the classification scores, wherein the input to the neural network comprises a stack of feature vectors and wherein the textual elements search circuitry is configured to determine the sequence of textual elements based on a comparison of the classification scores to statistical models.

In one or more third embodiments, a system for providing a neural network comprises means for determining a score for the node of the neural network, wherein the score comprises a sum of products of inputs to the node and weights associated with the node, and wherein the weights comprise fixed point integer values, means for modifying the score based on a bias associated with the node, means for applying at least one correction to the score based on at least one weight of the weights having an associated correction value, and means for generating an output from the node based on the corrected biased score.

Further to the third embodiments, the weights comprise 8 bit signed fixed point integer values having an associated scaling factor and wherein the neural network comprises a neural network layer including the node, and the system further comprises means for evaluating a corrections list associated with the neural network layer to determine the correction value, wherein the corrections list comprises correction values for one or more neural network layer weights of the neural network layer.

Further to the third embodiments, the node comprises a hidden layer node, wherein generating the output from the node based on the corrected biased score comprises applying a sigmoid activation function to the corrected biased score to generate the output, and wherein the output comprises an 8 bit unsigned fixed point integer value.

Further to the third embodiments, the system further comprises means for converting received speech to a speech recording, means for extracting feature vectors associated with time windows of the speech recording, means for providing the feature vectors as input to the neural network, means for generating classification scores from the speech recognition neural network based at least in part on the output from the node, and means for determining a sequence of textual elements based on the classification scores.

In one or more fourth embodiments, at least one machine readable medium comprises a plurality of instructions that, in response to being executed on a computing device, cause the computing device to process a node of a neural network by determining a score for the node of the neural network, wherein the score comprises a sum of products of inputs to the node and weights associated with the node, and wherein the weights comprise fixed point integer values, modifying the score based on a bias associated with the node, applying at least one correction to the score based on at least one weight of the weights having an associated correction value, and generating an output from the node based on the corrected biased score.

Further to the fourth embodiments, the weights comprise 8 bit signed fixed point integer values having an associated scaling factor, wherein the neural network comprises a neural network layer including the node, and the machine readable medium further comprises instructions that, in response to being executed on the computing device, cause the computing device to process a node of a neural network by evaluating a corrections list associated with the neural network layer to determine the correction value, wherein the corrections list comprises correction values for one or more neural network layer weights of the neural network layer.

Further to the fourth embodiments, the node comprises a hidden layer node, wherein generating the output from the node based on the corrected biased score comprises applying a sigmoid activation function to the corrected biased score to generate the output, wherein the output comprises an 8 bit unsigned fixed point integer value.

Further to the fourth embodiments, the corrected biased score comprises a 32 bit fixed point integer value.

Further to the fourth embodiments, the neural network comprises a speech recognition neural network, and the machine readable medium further comprises instructions that, in response to being executed on the computing device, cause the computing device to perform speech recognition by converting received speech to a speech recording, extracting feature vectors associated with time windows of the speech recording, providing the feature vectors as input to the neural network, generating classification scores from the speech recognition neural network based at least in part on the output from the node, and determining a sequence of textual elements based on the classification scores.

Further to the fourth embodiments, the weights comprise 8 bit signed fixed point integer values having an associated scaling factor, wherein the inputs comprises 8 bit unsigned fixed point integer values, wherein the corrected biased score comprises a 32 bit fixed point integer value, wherein the node comprises a hidden layer node, wherein generating the output from the node based on the corrected biased score comprises applying a sigmoid activation function to the corrected biased score to generate the output, and wherein the output comprises an 8 bit unsigned fixed point integer value.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for processing a node of a neural network comprising:
   determining a score for the node of the neural network, the score comprising a sum of products of inputs to the node and weights associated with the node, wherein the weights comprise fixed point integer values and the weights comprise a subset of first weights having associated correction values and a subset of second weights not having associated correction values;
   modifying the score based on a bias associated with the node;
   applying a plurality of corrections to the score responsive to the correction values associated with the subset of first weights, each correction comprising a product of the associated correction value and a corresponding input of the inputs to the node; and
   generating an output from the node based on the corrected biased score.

2. The method of claim 1, wherein the weights comprise 8 bit signed fixed point integer values having an associated scaling factor.

3. The method of claim 2, wherein the neural network comprises a neural network layer including the node, the method further comprising:
   evaluating a corrections list associated with the neural network layer to determine the correction values associated with the subset of the first weights, wherein the corrections list comprises neural network layer correction values for neural network layer weights of the neural network layer.

4. The method of claim 3, wherein the scaling factor for the neural network layer weights of the neural network layer is a maximum scaling factor value that provides a corrections count for the neural network layer that is less than a predetermined corrections count limit.

5. The method of claim 3, wherein the neural layer network layer weights are converted from floating point value neural network layer weights, the neural network layer weights comprise 8 bit signed fixed point integer values, the corrections list comprises the neural network layer correction values for the neural network layer weights and associated node and weight indices for the neural network layer correction values, the neural network layer correction values being associated with 8 bit unsigned fixed point integer neural network layer weights having a non-zero most significant bit.

6. The method of claim 1, wherein the node comprises a hidden layer node and generating the output from the node based on the corrected biased score comprises applying an activation function to the corrected biased score to generate the output.

7. The method of claim 6, wherein the activation function comprises a sigmoid function and the output comprises an 8 bit unsigned fixed point integer value.

8. The method of claim 1, wherein the node comprises an output node and generating the output from the node based on the corrected biased score comprises providing the corrected biased score as the output.

9. The method of claim 1, wherein the corrected biased score comprises a 32 bit fixed point integer value.

10. The method of claim 1, wherein modifying the score by the bias is performed prior to applying the at least one correction to the score.

11. The method of claim 1, wherein the neural network comprises a speech recognition neural network, the method further comprising:
    converting received speech to a speech recording;
    extracting feature vectors associated with time windows of the speech recording;
    providing the feature vectors as input to the neural network;
    generating classification scores from the speech recognition neural network based at least in part on the output from the node; and
    determining a sequence of textual elements based on the classification scores.

12. The method of claim 11, wherein the weights comprise 8 bit signed fixed point integer values having an associated scaling factor, the inputs comprise 8 bit unsigned fixed point integer values, the corrected biased score comprises a 32 bit fixed point integer value, the node comprises a hidden layer node, generating the output from the node based on the corrected biased score comprises applying a sigmoid activation function to the corrected biased score to generate the output, and the output comprises an 8 bit unsigned fixed point integer value.

13. The method of claim 11, wherein the input to the neural network comprises a stack of feature vectors and determining the sequence of textual elements comprises comparing the classification scores to statistical models.

14. A system for providing a neural network comprising:
a memory to store weights associated with a node of the neural network, the weights comprising fixed point integer values; and
one or more processors coupled to the memory, the one or more processors to:
determine a score for the node of the neural network, the score comprising a sum of products of inputs to the node and the weights associated with the node, wherein the weights comprise fixed point integer values and the weights comprise a subset of first weights having associated correction values and a subset of second weights not having associated correction values;
modify the score based on a bias associated with the node;
apply a plurality of corrections to the score responsive to the correction values associated with the subset of first weights, each correction comprising a product of the associated correction value and a corresponding input of the inputs to the node; and
generate an output from the node based on the corrected biased score.

15. The system of claim 14, wherein the weights comprise 8 bit signed fixed point integer values having an associated scaling factor, the neural network comprises a neural network layer comprising the node, and the one or more processors are further to:
evaluate a corrections list associated with the neural network layer to determine the correction values associated with the subset of the first weights, wherein the corrections list comprises neural network layer correction values for neural network layer weights of the neural network layer.

16. The system of claim 14, wherein the activation function comprises a sigmoid function and the output comprises an 8 bit unsigned fixed point integer value.

17. The system of claim 14, wherein the corrected biased score comprises a 32 bit fixed point integer value.

18. The system of claim 14, wherein the weights comprise 8 bit signed fixed point integer values having an associated scaling factor, the inputs comprise 8 bit unsigned fixed point integer values, the corrected biased score comprises a 32 bit fixed point integer value, the node comprises a hidden layer node, the activation function comprises a sigmoid activation function, and the output comprises an 8 bit unsigned fixed point integer value.

19. The system of claim 14, the one or more processors further to:
extract feature vectors associated with time windows of a speech recording and to provide the feature vectors as input to the neural network;
receive classification scores from the neural network, wherein the classification scores are based at least in part on the output from the node; and
determine a sequence of textual elements based on the classification scores.

20. At least one non-transitory machine readable medium comprising a plurality of instructions that, in response to being executed on a computing device, cause the computing device to process a node of a neural network by:
determining a score for the node of the neural network, the score comprising a sum of products of inputs to the node and weights associated with the node, wherein the weights comprise fixed point integer values and the weights comprise a subset of first weights having associated correction values and a subset of second weights not having associated correction values;
modifying the score based on a bias associated with the node;
applying a plurality of corrections to the score responsive to the correction values associated with the subset of first weights, each correction comprising a product of the associated correction value and a corresponding input of the inputs to the node; and
generating an output from the node based on the corrected biased score.

21. The non-transitory machine readable medium of claim 20, wherein the weights comprise 8 bit signed fixed point integer values having an associated scaling factor and the neural network comprises a neural network layer including the node, the machine readable medium further comprising instructions that, in response to being executed on the computing device, cause the computing device to process a node of a neural network by:
evaluating a corrections list associated with the neural network layer to determine the correction values associated with the subset of the first weights, wherein the corrections list comprises neural network layer correction values for neural network layer weights of the neural network layer.

22. The non-transitory machine readable medium of claim 20, wherein the node comprises a hidden layer node, generating the output from the node based on the corrected biased score comprises applying a sigmoid activation function to the corrected biased score to generate the output, and the output comprises an 8 bit unsigned fixed point integer value.

23. The non-transitory machine readable medium of claim 20, wherein the corrected biased score comprises a 32 bit fixed point integer value.

24. The non-transitory machine readable medium of claim 20, wherein the neural network comprises a speech recognition neural network, the machine readable medium further comprising instructions that, in response to being executed on the computing device, cause the computing device to perform speech recognition by:
converting received speech to a speech recording;
extracting feature vectors associated with time windows of the speech recording;
providing the feature vectors as input to the neural network;
generating classification scores from the speech recognition neural network based at least in part on the output from the node; and
determining a sequence of textual elements based on the classification scores.

25. The non-transitory machine readable medium of claim 24, wherein the weights comprise 8 bit signed fixed point integer values having an associated scaling factor, the inputs comprise 8 bit unsigned fixed point integer values, the corrected biased score comprises a 32 bit fixed point integer value, the node comprises a hidden layer node, generating the output from the node based on the corrected biased score comprises applying a sigmoid activation function to the corrected biased score to generate the output, and the output comprises an 8 bit unsigned fixed point integer value.

* * * * *